United States Patent
Bhargava et al.

(10) Patent No.: US 12,238,513 B2
(45) Date of Patent: *Feb. 25, 2025

(54) METHODS AND SYSTEMS AND SECURE CONNECTIONS FOR JOINING WIRELESS NETWORKS

(71) Applicant: M87, Inc., San Diego, CA (US)

(72) Inventors: Vidur Bhargava, San Diego, CA (US); Eric Kord Henderson, Austin, TX (US); Peter Matthew Feldman, Austin, TX (US)

(73) Assignee: M87, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/488,894

(22) Filed: Oct. 17, 2023

(65) Prior Publication Data
US 2024/0163663 A1 May 16, 2024

Related U.S. Application Data

(63) Continuation of application No. 17/338,462, filed on Jun. 3, 2021, now Pat. No. 11,832,097, which is a
(Continued)

(51) Int. Cl.
*H04W 12/02* (2009.01)
*H04L 9/40* (2022.01)
(Continued)

(52) U.S. Cl.
CPC ......... *H04W 12/02* (2013.01); *H04L 63/0209* (2013.01); *H04L 63/0428* (2013.01);
(Continued)

(58) Field of Classification Search
CPC ... H04W 12/02; H04W 12/033; H04W 12/04; H04W 84/042; H04W 84/047;
(Continued)

(56) References Cited

U.S. PATENT DOCUMENTS 6,137,796 A 10/2000 Derango et al.
7,099,283 B2 8/2006 Matta et al.
(Continued)

FOREIGN PATENT DOCUMENTS

CN 1910877 2/2007
CN 101232519 7/2008
(Continued)

OTHER PUBLICATIONS

Jeong et al., "An integrated security framework for open wireless networking architecture", Apr. 2007, IEEE Wireless Communications, vol. 14, No. 2, pp. 10-18 (Year: 2007).*
(Continued)

*Primary Examiner* — Kenneth W Chang
(74) *Attorney, Agent, or Firm* — Knobbe, Martens, Olson & Bear, LLP

(57) ABSTRACT

The subject matter describes devices, networks, systems, media, and methods to create secure communications between wireless devices and cellular networks, where the wireless devices communicate with the cellular networks via multi-hopping methods in wireless networks.

27 Claims, 21 Drawing Sheets

Related U.S. Application Data continuation of application No. 16/748,558, filed on Jan. 21, 2020, now Pat. No. 11,064,355, which is a continuation of application No. 16/160,013, filed on Oct. 15, 2018, now Pat. No. 10,575,170, which is a continuation of application No. 15/103,815, filed as application No. PCT/US2014/070120 on Dec. 12, 2014, now Pat. No. 10,136,311.

(60) Provisional application No. 61/916,334, filed on Dec. 16, 2013, provisional application No. 61/915,949, filed on Dec. 13, 2013.

(51) Int. Cl.
*H04W 12/033* (2021.01)
*H04W 12/04* (2021.01)
*H04W 84/04* (2009.01)
*H04W 88/04* (2009.01)

(52) U.S. Cl.
CPC ......... *H04L 63/164* (2013.01); *H04W 12/033* (2021.01); *H04W 12/04* (2013.01); *H04L 63/0272* (2013.01); *H04W 84/042* (2013.01); *H04W 84/047* (2013.01); *H04W 88/04* (2013.01)

(58) Field of Classification Search
CPC ............... H04W 88/04; H04L 63/0209; H04L 63/0428; H04L 63/164; H04L 63/0272
See application file for complete search history.

(56) References Cited

U.S. PATENT DOCUMENTS

| | | | |
|---|---|---|---|
| 7,352,729 B2 | 4/2008 | Fujiwara et al. | |
| 7,742,497 B2 | 6/2010 | Ganti et al. | |
| 8,089,970 B2 | 1/2012 | Ramprashad et al. | |
| 8,743,758 B1 | 6/2014 | Bhargava et al. | |
| 8,868,034 B2* | 10/2014 | Dodeja | H04W 12/069 455/410 |
| 9,148,908 B2 | 9/2015 | Bhargava et al. | |
| 9,155,124 B2 | 10/2015 | Bhargava et al. | |
| 9,363,006 B2 | 6/2016 | Bhargava et al. | |
| 9,414,434 B2 | 8/2016 | Bhargava et al. | |
| 9,451,514 B1 | 9/2016 | Michel et al. | |
| 9,578,591 B2 | 2/2017 | Bhargava et al. | |
| 9,794,949 B2 | 10/2017 | Bhargava et al. | |
| 9,806,791 B2 | 10/2017 | Bhargava et al. | |
| 9,942,921 B2 | 4/2018 | Bhargava et al. | |
| 9,986,480 B2 | 5/2018 | Ta et al. | |
| 10,123,268 B2 | 11/2018 | Bhargava et al. | |
| 10,136,311 B2 | 11/2018 | Bhargava et al. | |
| 10,205,505 B2 | 2/2019 | Michel et al. | |
| 10,206,228 B2 | 2/2019 | Bhargava et al. | |
| 10,292,019 B2 | 5/2019 | Ta et al. | |
| 10,333,612 B2 | 6/2019 | Bhargava et al. | |
| 10,517,027 B2 | 12/2019 | Ta et al. | |
| 10,568,139 B2 | 2/2020 | Bhargava et al. | |
| 10,575,170 B2 | 2/2020 | Bhargava et al. | |
| 11,064,355 B2 | 7/2021 | Bhargava et al. | |
| 11,832,097 B2 | 11/2023 | Bhargava et al. | |
| 2002/0058502 A1 | 5/2002 | Stanforth | |
| 2002/0091921 A1 | 7/2002 | Kunzinger | |
| 2002/0136183 A1 | 9/2002 | Chen et al. | |
| 2003/0145229 A1 | 7/2003 | Cohen et al. | |
| 2003/0149789 A1 | 8/2003 | Hoffmann | |
| 2003/0235174 A1 | 12/2003 | Pichna et al. | |
| 2004/0023652 A1 | 2/2004 | Shah et al. | |
| 2004/0033778 A1 | 2/2004 | Fonseca, Jr. et al. | |
| 2004/0166853 A1 | 8/2004 | Takeda et al. | |
| 2004/0192288 A1 | 9/2004 | Vishwanath | |
| 2005/0002364 A1 | 1/2005 | Ozer et al. | |
| 2005/0025178 A1 | 2/2005 | Shirota et al. | |
| 2005/0030920 A1 | 2/2005 | Cadarso et al. | |
| 2005/0208966 A1 | 9/2005 | David et al. | |
| 2006/0009201 A1 | 1/2006 | Gallagher et al. | |
| 2006/0052099 A1 | 3/2006 | Parker | |
| 2006/0130136 A1* | 6/2006 | Devarapalli | H04L 63/0272 726/15 |
| 2006/0156392 A1 | 7/2006 | Baugher | |
| 2006/0159053 A1 | 7/2006 | Donovan | |
| 2007/0005954 A1 | 1/2007 | Skemer | |
| 2007/0041345 A1 | 2/2007 | Yarvis et al. | |
| 2007/0189221 A1 | 8/2007 | Isobe et al. | |
| 2007/0264932 A1 | 11/2007 | Suh et al. | |
| 2008/0065888 A1 | 3/2008 | Zheng et al. | |
| 2008/0188177 A1 | 8/2008 | Tan et al. | |
| 2008/0222250 A1 | 9/2008 | Datta | |
| 2008/0316970 A1 | 12/2008 | Choi | |
| 2009/0088070 A1 | 4/2009 | Aaron | |
| 2009/0092075 A1 | 4/2009 | Corson et al. | |
| 2009/0147710 A1* | 6/2009 | Choi | H04W 84/18 370/310 |
| 2009/0254976 A1 | 10/2009 | Huotari et al. | |
| 2009/0303034 A1 | 12/2009 | Abedi | |
| 2010/0138661 A1 | 6/2010 | Tsai et al. | |
| 2010/0151899 A1 | 6/2010 | Lekutai | |
| 2010/0226336 A1 | 9/2010 | Ng et al. | |
| 2010/0278110 A1 | 11/2010 | Ozawa | |
| 2010/0293598 A1 | 11/2010 | Collart et al. | |
| 2010/0299519 A1 | 11/2010 | Xiao et al. | |
| 2010/0332831 A1 | 12/2010 | Shon et al. | |
| 2011/0035491 A1 | 2/2011 | Gelvin et al. | |
| 2011/0090839 A1 | 4/2011 | Hamalainen et al. | |
| 2011/0126015 A1 | 5/2011 | Shon et al. | |
| 2011/0249609 A1 | 10/2011 | Brusilovsky et al. | |
| 2011/0255511 A1 | 10/2011 | Ikeda | |
| 2011/0280187 A1 | 11/2011 | Meyer | |
| 2012/0071168 A1* | 3/2012 | Tomici | H04W 40/04 455/445 |
| 2012/0214445 A1 | 8/2012 | Stojanovski et al. | |
| 2012/0233656 A1 | 9/2012 | Rieschick et al. | |
| 2013/0034031 A1 | 2/2013 | Sherman et al. | |
| 2013/0083722 A1 | 4/2013 | Bhargava et al. | |
| 2013/0104207 A1 | 4/2013 | Kroeselberg et al. | |
| 2013/0137469 A1 | 5/2013 | Schmidt et al. | |
| 2013/0142050 A1 | 6/2013 | Luna | |
| 2013/0163463 A1* | 6/2013 | Grayson | H04L 43/0876 370/253 |
| 2013/0223329 A1 | 8/2013 | Jain et al. | |
| 2013/0242783 A1 | 9/2013 | Horn et al. | |
| 2013/0267223 A1 | 10/2013 | Tajima et al. | |
| 2013/0295921 A1 | 11/2013 | Bhargava et al. | |
| 2013/0335528 A1 | 12/2013 | Vishwanath et al. | |
| 2013/0339724 A1 | 12/2013 | Amit et al. | |
| 2014/0026180 A1 | 1/2014 | Baglin et al. | |
| 2014/0213269 A1 | 7/2014 | Nama et al. | |
| 2016/0315688 A1 | 10/2016 | Bhargava et al. | |
| 2018/0014311 A1 | 1/2018 | Bhargava et al. | |
| 2019/0053048 A1 | 2/2019 | Bhargava et al. | |
| 2019/0253844 A1 | 8/2019 | Ta et al. | |
| 2020/0162903 A1 | 5/2020 | Bhargava et al. | |

FOREIGN PATENT DOCUMENTS

| | | |
|---|---|---|
| CN | 101513092 | 8/2009 |
| CN | 102893642 | 1/2013 |
| CN | 102986262 | 3/2013 |
| CN | 103262632 | 8/2013 |
| DE | 10309228 | 9/2004 |
| EP | 0986218 | 3/2000 |
| EP | 1744502 | 1/2007 |
| EP | 2385678 | 11/2011 |
| EP | 2458932 | 5/2012 |
| KR | 10-2005-0050236 | 5/2005 |
| KR | 10-2010-0068168 | 6/2010 |
| WO | WO 2003/085891 | 10/2003 |
| WO | WO 2011/149532 | 12/2011 |
| WO | WO 2011/153507 | 12/2011 |
| WO | WO 2012/016187 | 2/2012 |

(56) References Cited

FOREIGN PATENT DOCUMENTS

| WO | WO 2012/122508 | 9/2012 |
|---|---|---|
| WO | WO 2015/081030 | 6/2015 |
| WO | WO 2015/089457 | 6/2015 |

OTHER PUBLICATIONS

Balraj, "Qualcomm Research San Diego: LTE Direct Overview", 2012, in 23 pages.
Croft, "Wi-Fi Service Discovery over 802.11u Using Non-Native Generic Advertising Services (GAS-SD)", 50 pages, May 2014.
International Search Report and Written Opinion for International Application No. PCT/US2011/039180 dated Jan. 11, 2012.
International Search Report and Written Opinion for International Application No. PCT/US2011/045967 dated Mar. 19, 2012.
International Search Report and Written Opinion for International Application No. PCT/US2012/028571 dated Aug. 24, 2012.
International Preliminary Report on Patentability in International Application No. PCT/US2011/039180, dated Dec. 13, 2012.
International Preliminary Report on Patentability in International Application No. PCT/US2011/045967, dated Feb. 14, 2013.
International Preliminary Report on Patentability in International Application No. PCT/US2012/028571, dated Sep. 19, 2013.
Jubin et al., "Distributed Rate Allocation for Wireless Networks", http:arxiv.org/abs/100232813, Apr. 6, 2010.
Lee et al., "The remote access to IPsec-VPN gateway over mobile IPv6," Feb. 2005, the 7th International Conference on Advanced Communication Technology, pp. 567-569.
Lei et al., "Research on the method of WLAN Interworking with EPC", Designing Techniques of Posts and Telecommunications 4:35-37, 2013, English Abstract.
Pulgarin et al., "An Overlay Gateway for the Integration of IP Multimedia Subsystem and Mobile Sink Based—Wireless Sensor Networks", IEEE 72nd Vehicular Technology Conference, Sep. 2010, pp. 1-5.
Sampath, "A hypothetical wireless network with mobile base stations in urban areas", Proceedings International Resource Management Conference, May 19-21, 2003, in 3 pages.
Sampath, "A protocol and an algorithm for mobile station floor location suing 'Listeners'", Proceedsings 40th ACM Southeastern Conference, May 28-31, 2002, pp. 382-387.
Xenakis et al., Dynamic network-based secure VPN deployment in GPRS. The 13th IEEE International Symposium on Personal, Indoor and Mobile Radio Communications 3:1260-1265 (2002).
Office Action in U.S. Appl. No. 14/264,314, dated Jun. 18, 2014.
Office Action in U.S. Appl. No. 14/264,314, dated Oct. 14, 2014.
Office Action in U.S. Appl. No. 14/264,314, dated Jul. 13, 2015.
Office Action in U.S. Appl. No. 14/264,314, dated Oct. 30, 2015.
Office Action in U.S. Appl. No. 15/202,451, dated Mar. 24, 2017.
Office Action in U.S. Appl. No. 15/202,451, dated Sep. 22, 2017.
Office Action in U.S. Appl. No. 15/103,815, dated Jan. 22, 2018.
Office Action in U.S. Appl. No. 15/202,451, dated May 22, 2018.
Office Action in U.S. Appl. No. 15/202,451, dated Nov. 23, 2018.
Office Action in U.S. Appl. No. 15/202,451, dated Mar. 29, 2019.
Office Action in U.S. Appl. No. 16/160,013, dated Apr. 28, 2019.
Office Action in U.S. Appl. No. 15/202,451, dated Aug. 1, 2019.
Office Action in U.S. Appl. No. 16/160,013, dated Sep. 6, 2019.
Office Action in U.S. Appl. No. 15/202,451, dated Jan. 3, 2020.
International Search Report and Written Opinion for International Application No. PCT/US2014/070120, dated Mar. 3, 2015.
International Search Report and Written Opinion for International Application No. PCT/US2014/067183, dated Feb. 26, 2015.
International Preliminary Report on Patentability for International Application No. PCT/US2014/067183, dated Jun. 9, 2016.
International Preliminary Report on Patentability for International Application No. PCT/US2014/070120, dated Jun. 23, 2016.
Office Action in Canadian Patent Application No. 2,933,698, dated Feb. 24, 2021, in 9 pages.
Office Action in Canadian Application No. 2,933,698, dated Jan. 11, 2022, in 3 pages.
Office Action in Chinese Application No. 202010486716.2, dated Dec. 21, 2022.
European Search Report in Application No. EP 20215846.5, dated Apr. 8, 2021, in 8 pages.
European Search Report in European Application No. EP 20215846.5, dated Mar. 29, 2023, in 7 pages.

\* cited by examiner

METHODS AND SYSTEMS AND SECURE CONNECTIONS FOR JOINING WIRELESS NETWORKS

CROSS REFERENCE TO RELATED APPLICATIONS

This application is a continuation of U.S. application Ser. No. 17/338,462, filed on Jun. 3, 2021, which is a continuation of U.S. application Ser. No. 16/748,558, filed on Jan. 21, 2020, which is a continuation of U.S. application Ser. No. 16/160,013, filed on Oct. 15, 2018, now issued as U.S. Pat. No. 10,575,170 on Feb. 25, 2020, which is a continuation of U.S. application Ser. No. 15/103,815, filed on Jun. 10, 2016, now issued as U.S. Pat. No. 10,136,311 on Nov. 20, 2018, which is a National Stage entry of International Application No. PCT/US2014/070120, filed on Dec. 12, 2014, which claims the benefit of priority to U.S. Provisional Application Nos. 61/915,949, filed Dec. 13, 2013, and 61/916,334, filed Dec. 16, 2013, all of which are hereby incorporated by reference in their entireties.

BACKGROUND OF THE INVENTION

Cellular communications have gained much popularity since 1990s. Traditionally, cellular networks are connected to public switched telephone network (PSTN) and are dedicated to voice communications. With advanced packet switching technologies, any raw signals can be formed in packets which can flow from the sender to the destination via the cellular networks and non-cellular networks. On the other hand, the manufacturing cost of cell phones, or called mobile phones, has decreased significantly, so mobile phones become affordable. It is believed that the mobile phones have penetrated more than 85% of the global population. Furthermore, more functionalities are added to mobile phones, leading the boundaries between mobile phones and personal computing devices to disappear. Many mobiles phones have now become smartphones or personal mobile computers. The smartphones allow subscribers not only to talk but also to enjoy the use of the Internet.

Due to a large volume of subscribers using smartphones, the demand of cellular transmission increases exponentially. However, the bandwidths of cellular networks are limited. A typical solution to the problem of bandwidth deficiency is to install more cellular base stations. Nevertheless, in the greater metropolitan areas, e.g., New York City, Chicago, Los Angeles, London, and Tokyo, there are sparse or no spaces to install more cellular base stations. Even though installing more base stations is feasible, users located at the "marginal-to-inoperative regions," such as the coverage edges of base stations, hilly terrain, concrete walls, or tall buildings, still face weak or blocked signals. As a sequel, a new way to increase the cellular coverage is necessary.

SUMMARY OF THE INVENTION

Advantages of the subject matter described herein utilize multi-hopping systems in non-cellular networks to securely connect wireless devices to cellular networks. Non-cellular networks, such as wireless local/wide area networks, Bluetooth networks and the Internet, are ubiquitous and are also directly or indirectly connected with cellular networks. The subject matter described herein exploits the hybrid of cellular and non-cellular networks to expand the coverage of cellular base stations. When a wireless device participates in a hybrid network, the subject method can configure the device's non-cellular interface to originate or relay a cellular communication via hopping on the non-cellular network. When connecting the device to a cellular network via hopping onto a non-cellular network, the device creates a secure tunnel between the device and the core of the cellular network. The secure tunnel can protect the data packets from being eavesdropped by another device during the communication path.

In one aspect, described herein is a system that comprises: wirelessly connecting a wireless device to a cellular network by single-hopping or multi-hopping to a sink device in a non-cellular network, and establishing a security tunnel in the wireless communication between the wireless device and a first gateway, which is located in the cellular network. The establishment of the security tunnel is based on a security key assigned (non-limiting examples include: by the cellular network, by a cellular operator, by an end-user, and/or by a certificate authority) to the wireless device. The system further comprises transmitting data packets between the wireless device and the first gateway; the transmission comprises encrypting by the wireless device the data packets, sending by the wireless device the encrypted data packets over the security tunnel to the first gateway, receiving by the first gateway the encrypted data packets, decrypting by the first gateway the encrypted data packets, and updating a network connection table by the first gateway. In some embodiments, the system further comprises sending by the first gateway the decrypted data packets to the Internet. In some embodiments, the first gateway sends the decrypted data packets to a second gateway that in turn sends the decrypted data packets to the Internet.

When data packets are sent from the Internet to the wireless device, the system comprises receiving the data packets by the first gateway. Alternatively, the data packets can be sent from the Internet to the second gateway that in turn sends the packets to the first gateway. The system further comprises transmitting data packets between the first gateway and the wireless device; the transmission comprises encrypting by the first gateway the data packets, sending by the first gateway the encrypted data packets over the security tunnel to the wireless device, receiving by the wireless device the encrypted data packets, and decrypting by the wireless device the encrypted data packets.

The transmission of data packets between the wireless device and the first gateway and/or the second gateway involves billing the user of the wireless device the amount of data packets being sent. Using the hopping technologies, the sink/relaying devices allowing the wireless devices to hop onto the non-cellular network also transfer the same amount of data packets sent/received by the wireless device. However, the courtesy of the sink/relaying devices should not be billed for the amount of data relayed. Therefore, the method further requests the first gateway and/or the second gateway to delete a billing record of the sink/relaying device.

DETAILED DESCRIPTION OF THE INVENTION

Figure 1:
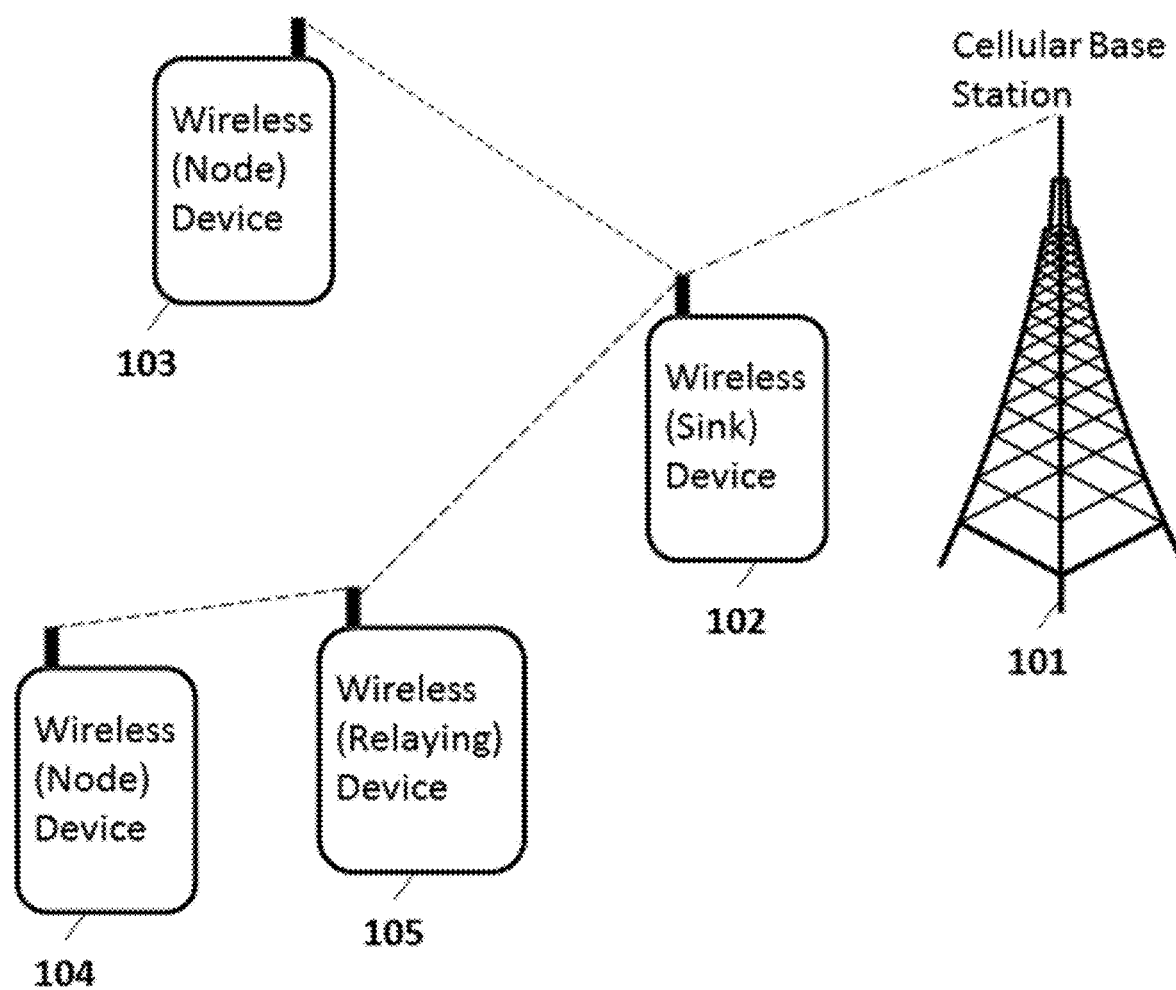
FIG. 1 shows a non-limiting example of a hopping system; in this case, the sink device relays the cellular communication to the node devices that connect to the sink device by single-hopping or multi-hopping on the non-cellular network.

Cellular communications have gained much popularity since 1990s. The principle of cellular communications is to divide a broad land area into a number of regular shaped cells, for example hexagonal, square, or circular shapes. Each of the cells is assigned one or more cellular base stations or cellular towers as hubs to manage wireless connectivity between mobile phones (or called cell phones) and the base stations. The base stations are further connected to public switched telephone network (PSTN), so traditionally the mobile phones in cellular networks were dedicated to voice communications.

With the advent of packet switching technologies, raw signals (e.g., voice, sound, and scenes) can be formed in packets which can flow from a sender to a destination without a direct link between the sender and the destination. When cellular networks are deployed with packet switching technologies, a mobile computing device can connect to the Internet or other data networks via a data cellular network. Thanks to modern semiconductor engineering, the sizes of electronic circuitries keep shrinking. When a mobile phone is equipped with electronic chips for handling traditional cellular networks and data cellular networks, the boundary between mobile phone and mobile computing device becomes illusive. Most modern mobile phones are also mobile computing devices.

The manufacturing cost of mobile devices has decreased significantly. Mobile devices have become affordable to the general public. It is believed that the mobile devices have penetrated more than 85% of the global population. With a dramatically increasing number of mobile device users, telecommunication providers face a challenge to expand their coverage. Moreover, more functionalities (e.g., camera, web search, emails, maps, Internet surfing) have been added to mobile phones and mobile devices. Mobile device users demand more bandwidth to enjoy the added functionalities. Such a demand compounds the challenge faced by the telecommunication providers.

To address the surging bandwidth demand in cellular networks, a typical solution is to install more cellular base stations. Nevertheless, in the greater metropolitan areas, by way of non-limiting examples, such as New York City, Chicago, Los Angeles, London, and Tokyo, there are sparse or no spaces to install more cellular base stations. In the cases where installing more base stations is feasible, users located at the "marginal-to-inoperative regions," such as the coverage edges of base stations, hilly terrain, concrete walls, or tall buildings, still face weak or blocked signals. As a sequel, a new way to increase the cellular coverage is necessary.

In typical cellular communication systems, a mobile device directly communicates with a cellular base station. In other words, the device connects to the cellular base station via a "single hop," where the signals are transmitted and received directly between the device and the cellular base station without being mediated or relayed through an intermediary device. Based on the single hopping communication, the maximum number of mobile phones simultaneously connecting to the base station is limited because the bandwidth of the base station is limited. Although sophisticated schemes of modulation and error-correcting codes can be adopted, the data rates need to be sacrificed.

In addition to cellular networks, there exist various non-cellular wireless networks, for instance, but not limited to, wireless local area networks, wireless wide area networks, Bluetooth networks, and in general the Internet. Modern technologies allow both cellular interface and non-cellular interface to be embedded in a mobile device. In other words, a modern mobile device can participate in a cellular network via the cellular interface, or participate in a non-cellular network via the non-cellular interface. While the two interfaces independently sit in the same mobile device, the subject matter described herein exploits both types of interfaces to expand the coverage of cellular networks.

The subject matter described herein solves the aforementioned problems by using multi-hop schemes in a hybrid of cellular networks and non-cellular networks. The subject matter can be applied to some embodiments of not only mobile devices but also generic wireless devices. To expand the coverage of a cellular communication system, a first wireless device with a poor cellular signal uses its non-cellular interface to communicate to a second wireless device which has a good cellular signal and relays the signals from the first wireless device to the cellular base station. In such embodiments, the cellular resources, such as data rate and bandwidth, of the second wireless device is shared with the first wireless device. The first wireless device successfully communicates to the cellular base station via two hops: hopping to the second wireless device that in turn hops to the cellular base station. The "double-hop" connectivity in these embodiments can be extended to a "multi-hop" connectivity in other embodiments. For example, the first wireless device can hop to the second wireless device, then to a third wireless device, and finally to a cellular base station. The number of hops can be as many as possible, as long as some criteria is satisfied, by way of non-limiting examples, such as battery life, noise level, interference level, data rate, and bandwidth.

The hopping technologies allow the cellular networks to expand their coverage. However, the devices (by way of non-limiting examples, smartphones, routers, switches, gateways, computers, and/or portable electronic devices) transferring the data between an end terminal and a cellular core network may eavesdrop a signal and/or a data packet. Therefore, the subject system described herein can further create a security tunnel between the terminal wireless device and a first gateway located in the cellular core network. The creation of the security tunnel is based on a security key assigned (non-limiting examples include: by the cellular network, by a cellular operator, by an end-user, and/or by a certificate authority) to the wireless device. The system further comprises transmitting data packets between the wireless device and the first gateway; the transmission comprises encrypting by the wireless device the data packets, sending by the wireless device the encrypted data packets over the security tunnel to the first gateway, receiving by the first gateway the encrypted data packets, decrypting by the first gateway the encrypted data packets, and updating a network connection table by the first gateway. Non-limiting examples of network connection tables include routing table, ARP table, and bearer table. In some embodiments, the system further comprises sending by the first gateway the decrypted data packets to the Internet. In some embodiments, the first gateway sends the decrypted data packets to a second gateway that in turn sends the decrypted data packets to the Internet.

The subject system can further handle data packets sent from the Internet to the wireless device. The first gateway in the system receives the data packets from the Internet. Alternatively, the data packets can be sent from the Internet to the second gateway that in turn sends the packets to the first gateway. The system further comprises transmitting data packets between the first gateway and the wireless device; the transmission comprises encrypting by the first gateway the data packets, sending by the first gateway the encrypted data packets over the security tunnel to the wireless device, receiving by the wireless device the encrypted data packets, and decrypting by the wireless device the encrypted data packets.

The transmission of data packets between the wireless device and the first gateway and/or the second gateway involves billing the user of the wireless device the amount of data packets being sent. Using the hopping technologies, the sink/relaying devices allowing the wireless devices to hop onto the non-cellular network also transfer the same amount of data packets sent and received by the wireless device. However, the courtesy of the sink/relaying devices should not be billed for the amount of data relayed. Therefore, the system further requests the first gateway (and/or the second gateway, if applicable) to delete a billing record of the sink/relaying devices. By way of non-limiting examples, a billing record includes the amount of data sent and received by a device via the cellular network, the amount of time spent on using cellular network resources, or a combination of them.

In some embodiments, the system described herein comprises non-transitory computer-readable storage media encoded with a computer program including instructions executable by a processor of a device, or processors of a plurality of devices to create an application. The application comprises a software module configured to establish and maintain a communication between a wireless device and a cellular network via hopping to other sink/relaying devices in a non-cellular network; a software module configured to create a security tunnel between the terminal wireless device and a first gateway, where the first gateway is located in the cellular network. The creation of the security tunnel is based on a security key assigned (non-limiting examples include: by the cellular network, by a cellular operator, by an end-user, and/or by a certificate authority) to the wireless device. In some embodiments, the application further comprises a software module configured to transmit data packets between the wireless device and the first gateway; the transmission comprises encrypting by the wireless device the data packets, and sending by the wireless device the encrypted data packets over the security tunnel to the first gateway. In some embodiments, the application comprises a software module configured by the first gateway to receive the encrypted data packets, decrypt the encrypted data packets, and update a network connection table. In some embodiments, the application further comprises a software module configured by the first gateway to send the decrypted data packets to the Internet. In some embodiments, the first gateway sends the decrypted data packets to a second gateway that in turn sends the decrypted data packets to the Internet.

In some embodiments, the application further comprises software modules to handle data packets sent from the Internet to the wireless device. The application comprises a software module configured by the first gateway to receive the data packets from the Internet. Alternatively, the data packets can be sent from the Internet to the second gateway that in turn sends the packets to the first gateway. In further embodiments, the application comprises a software module configured by the first gateway to transmit the data packets to the wireless device by encrypting the data packets, and sending the encrypted data packets over the security tunnel to the wireless device. In further embodiments, the application includes a software module configured by the wireless device to receive the encrypted data packets, and decrypt the encrypted data packets.

In some embodiments, the application comprises a software module configured to handle billing records. The transmission of data packets between the wireless device and the first gateway and/or the second gateway involves billing the user of the wireless device the amount of data packets being sent. Using the hopping technologies, the sink/relaying devices allowing the wireless devices to hop onto the non-cellular network also transfer the same amount of data packets sent and received by the wireless device. However, the courtesy of the sink/relaying devices should not be billed for the amount of data relayed. Therefore, the application further comprises a software module configured to request the first gateway (and/or the second gateway, if applicable) to delete a billing record of the sink/relaying devices.

In another aspect, disclosed is a computer-implemented method/system comprising: (a) connecting a wireless device to a cellular network by single-hopping or multi-hopping to a sink device in a non-cellular network; and (b) establishing a security tunnel between the wireless device and a first gateway. In some embodiments, the first gateway comprises one or more of the following: an evolved packet data gateway, a packet data gateway, and an IPsec gateway. In some embodiments, establishing the security tunnel comprises a key assigned to the wireless device by the cellular network. In additional embodiments, the method/system comprises (a) encrypting by the wireless device a first data packet; (b) sending by the wireless device the encrypted first data packet over the security tunnel to the first gateway; (c) receiving by the first gateway the encrypted first data packet; (c) decrypting by the first gateway the encrypted first data packet; and (d) updating a network connection table by the first gateway. The method/system further comprises sending by the first gateway the decrypted first data packet to the Internet. In addition, the method/system comprises that the first gateway deletes a first billing record of the sink device. In some instances, the method/system comprises sending by the first gateway the decrypted first data packet to a second gateway. The method/system comprises that the first gateway requests the second gateway to delete the first billing record of the sink device. The method/system comprises that the second gateway does not bill a first tunneled data packet destinated to or sourced from the first gateway. The second gateway comprises a packet gateway. In further embodiments, the method further comprises sending by the second gateway the decrypted first data packet to the Internet. In further embodiments, the method/system further comprises receiving by the first gateway a second data packet from the Internet. The method/system comprises receiving by the second gateway a second data packet from the Internet. The method/system comprises sending by the second gateway the second data packet to the first gateway. Additionally, the method comprises: (a) encrypting by the first gateway the second data packet; (b) sending by the first gateway the encrypted second data packet over the security tunnel to the wireless device; (c) receiving by the wireless device the encrypted second data packet; and (d) decrypting by the wireless device the encrypted second data packet. The method/system further comprises modifying by the first gateway a destination address of the second data packet. The method/system comprises that the first gateway deleting a second billing record of the sink device. The method/system comprises that the first gateway requests the second gateway to delete a second billing record of the sink device. The method/system comprises that the second gateway does not bill a second tunneled data packet destinated to or sourced from the first gateway.

Certain Definitions

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

Overarching Method/System Design

The overarching method/system described herein comprises: (a) connecting a wireless device to a cellular network by single-hopping or multi-hopping to a sink device in a non-cellular network; and (b) establishing a security tunnel between the wireless device and a first gateway. The first gateway comprises one or more of: an evolved packet data gateway, packet data gateway, and IPsec gateway. In some embodiments, establishing the security tunnel is based on a key assigned to the wireless device by the cellular network.

In additional embodiments, The method/system comprises: (a) encrypting by the wireless device a first data packet; (b) sending by the wireless device the encrypted first data packet over the security tunnel to the first gateway; (c) receiving by the first gateway the encrypted first data packet; (d) decrypting by the first gateway the encrypted first data packet; and (e) updating a network connection table by the first gateway. In further embodiments, the method/system comprises one or more of: (a) modifying by the first gateway a source address of the decrypted first data packet, (b) sending by the first gateway the decrypted first data packet to the Internet, (c) sending by the first gateway the decrypted first data packet to a second gateway.

Furthermore, the method/system in some embodiments comprises deleting by the first gateway a first billing record of the sink device. In some cases, the method/system comprises sending by the first gateway a request to the second gateway to delete a first billing record of the sink device. In some embodiments, the method/system comprises deep packet inspecting by the second gateway so that the second gateway does not create a first billing record of the sink device. In some implementations, the method/system comprises sending by the second gateway the decrypted first data packet to the Internet.

Non-limiting examples of the second gateway include a packet data gateway. In some examples, the second gateway (e.g., PGW) uses deep packet inspection (e.g., a whitelist rule) so that it does not create billing records for tunneled packets (e.g., IPsec tunneled packets) destined to (e.g., destination IP address of the tunneled packets matches that of the first gateway) or sourced from (e.g., source IP address of the tunneled packets matches that of the first gateway) the first gateway (e.g., ePDG).

In some embodiments, the method/system further comprises receiving by the first gateway a second data packet from the Internet. Alternatively, the second gateway receives a second data packet from the Internet and sends the second data packet to the first gateway. In some embodiments, the first gateway modifies a destination address of the second data packet. In additional embodiments, the method/system comprises (a) encrypting by the first gateway the second data packet; (b) sending by the first gateway the encrypted second data packet over the security tunnel to the wireless device; (c) receiving by the wireless device the encrypted second data packet; and (d) decrypting by the wireless device the encrypted second data packet.

Further embodiments following the previous paragraph include one or more of the following: (a) deleting by the first gateway a second billing record of the sink device, (b) sending by the first gateway a request to the second gateway to delete a second billing record of the sink device, and (c) deep packet inspecting by the second gateway so that the second gateway does not create a second billing record of the sink device.

Wireless Device

In some embodiments, the media, devices, networks, systems, and methods described herein include one or more wireless devices. Suitable wireless devices are, by way of non-limiting examples, mobile phones, mobile computing devices, smartphones, portable computers, tablet computers, mobile computers, hot spots, routers, gateways, switches, cameras, audio recorders, video recorders, music players, video players, portable electronic devices, and wearable electronic devices. Alternatively, the wireless devices comprise non-portable devices containing cellular interfaces and/or non-cellular interfaces; by way of a non-limiting example, a computing device has an adaptor for cellular communication and another adaptor for non-cellular communication.

In some embodiments, a wireless device used by the subject matter described herein is equipped with a non-cellular interface only; i.e., the device does not comprise a cellular interface. With appropriate configuration, the wireless device can utilize the non-cellular interface to connect to another wireless device that relays the signals to a cellular network. For instance, mobile computing devices (e.g., iPads) equipped with only non-cellular interfaces (e.g., Wi-Fi chipsets) can be embodied.

In some embodiments, the wireless devices on a hybrid network described in the subject matter are of the same type. By way of non-limiting examples, the wireless devices could be all mobile phones, or portable computing devices. In other embodiments, the types of the wireless devices on a hybrid network are mixed. For instance, by way of a non-limiting example, a wireless device includes a smartphone, another wireless device includes a laptop, and another wireless device includes a Wi-Fi hot spot.

In some embodiments, the media, devices, networks, systems, and methods described herein include a wireless device equipped with a digital processor, or use of the same. In further embodiments, the digital processor includes one or more hardware central processing units (CPUs) that carry out the device's functions. In still further embodiments, the digital processor further comprises an operating system configured to perform executable instructions.

In some embodiments, the wireless device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX °, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile ° OS, Linux®, and Palm® WebOS®.

In some embodiments, the wireless device includes a storage and/or memory device. The storage and/or memory device is one or more physical apparatuses used to store data or programs on a temporary or permanent basis. In some embodiments, the storage device is volatile memory and requires power to maintain stored information. In some embodiments, the device is non-volatile memory and retains stored information when the wireless device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the storage device includes, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the wireless device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In still further embodiments, the display is a combination of devices such as those disclosed herein.

In some embodiments, the wireless device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera to capture motion or visual input. In still further embodiments, the input device is a combination of devices such as those disclosed herein.

Hybrid/Multi-Hop Network

In some embodiments, the media, devices, networks, systems, and methods described herein include a wireless device as a hybrid, multi-hop network. FIG. 1 is a non-limiting example illustrating some embodiments of a hybrid, multi-hop network. Referring to FIG. 1, the wireless device 102 directly connects to a cellular base station 101. The communication network between the base station 101 and device 102 is based on a cellular communication protocol, namely forming a cellular network. The device 102 embodied in FIG. 1 connects to the base station 101 via a single hop.

Referring to FIG. 1, the wireless device 103 does not have optimal cellular signals directly connecting to the base station 101. However, the signals of the device 103 can hop onto the device 102 which in turn relays the signals to the base station 101. The communication between the device 103 and the base station 101 is a two-hop communication. Moreover, the communication is on a hybrid of cellular network and non-cellular network. The wireless connection between devices 102 and 103 is based on their non-cellular interfaces, by way of non-limiting examples, such as Wi-Fi interfaces, Bluetooth interfaces, LTE-Direct interfaces, optical interfaces, or infrared interfaces. The wireless connection between cellular base station 101 and device 102 is based on the cellular network, where the cellular communication resources of device 102 (by way of non-limiting examples, such as bandwidth and data rate) are shared with the device 103.

Similarly, with reference to FIG. 1, the wireless device 104 does not have optimal cellular signals directly connecting to the base station 101. However, the device 104 can communicate with the base station 101 via three hops: hopping onto the wireless device 105, then onto the wireless device 102, and then onto the base station 101. The wireless links between devices 102, 104 and 105 are based on their non-cellular interfaces, by way of non-limiting examples, such as Wi-Fi interfaces, Bluetooth interfaces, LTE-Direct interfaces, optical interfaces, or infrared interfaces. The wireless link between cellular base station 101 and device 102 is based on the cellular network, where the cellular communication resources of device 102 (by way of non-limiting examples, such as bandwidth and data rate) are shared with the device 104.

In some embodiments, with reference to FIG. 1, the device 102 can concurrently relay signals originated from devices 103 and 104. In some embodiments, the device 102 can communicate with the base station 101 for its own use, while relaying signals from one of the devices 103 and 104 or from both of the devices 103 and 104.

In some cases embodied in FIG. 1, the wireless links in the non-cellular network can operate on the same protocol. In some cases, the links can operate on different protocols. By way of non-limiting examples, suitable protocol options are IEEE 802.11 standards, AP/AP protocols, STA/STA protocols, AP/STA protocols, AP/IBSS protocols, STA/IBSS protocols, AP/P2P-client protocols, AP/P2P-GO protocols, IBSS/IBSS protocols, P2P-GO/P2P-GO protocols, and P2P-Client/P2P-Client protocols, P2P-GO/STA protocols, STA/P2P-Client protocols, P2P-GO/IBSS protocols, P2P-Client/IBSS protocols, and P2P-GO/P2P-Client protocols. Those with skills in the art can recognize various combinations of protocols can be embodied in the subject matter described herein.

Sink/Relaying/Node Device

In some embodiments, the media, devices, networks, systems, and methods described herein include a wireless device as a sink device. A sink device in multi-hop, hybrid networks is a wireless device that has a direct wireless link to a cellular base station and that relays signals of other wireless devices. In the embodiments shown in FIG. 1, the device 102 is a sink device. The sink device is a gateway point between cellular networks and non-cellular networks. It enables other wireless devices in a non-cellular network to access a cellular network; in other words, sink devices enable other wireless devices to participate in the hybrid network. In some embodiments, there will be more than one sink device to enable the connections between cellular and non-cellular networks.

In some embodiments, the media, devices, networks, systems, and methods described herein include a wireless device as a node device. Referring to FIG. 1, devices 103 and 104 are node devices. A node device does not have an optimal direct connection to the cellular base station 101 and is an end terminal in the path of its communication to the cellular base station 101. In some embodiments of multi-hop, hybrid networks shown in FIG. 1, the node device 103 requests the upstream device 102 to relay a communication to the cellular base station 101; because the device 102 is a sink device, the device 103 can achieve the communication based on two hops. Similarly, the node device 104 requests the upstream device 105 to relay the signals. However, the device 105 does not have an optimal direct connection to the base station 101, so it further requests the device 102 for relaying the signals. It turns out that the device 104 spends three hops in order to connect to the base station 101. In some embodiments, a node device connects to a cellular base station in many hops, as long as the relaying devices are able to achieve the relaying task.

In some embodiments, the media, devices, networks, systems, and methods described herein include a wireless device as a relaying device. Referring to FIG. 1, a relaying device is the wireless device 105 that is an intermediary device in a communication path. The device 105 can be configured to communicate with the downstream wireless device 104 and the upstream wireless device 102. In some embodiments, the relaying device 105 can relay multiple communication paths. In some embodiments, the wireless connections between the device 105 and other devices 102 and 104 use a same protocol or use distinct protocols.

There are various conditions for the sink/relaying devices to relay the communication. By way of non-limiting examples, suitable conditions are battery life, bandwidth usages, device types, node-state signals, levels of mobility, time of day, subscription fees, user profiles, non-cellular signal strengths, cellular signal strengths, noise levels, and/or interference levels. By way of non-limiting examples, a battery life includes an amount of energy available, an amount of battery storage capacity, an amount of remaining unexhausted energy, an estimated use of time/energy for conducting hopping, the current usage pattern of batteries, an absolute amount of energy stored, an amount of fluid remaining in a reservoir (e.g., an amount of hydrogen or methane in a fuel cell). By way of non-limiting examples, bandwidth usages includes available bandwidth for establishing wireless links, an uplink available bandwidth, a downlink available bandwidth, and an estimated usage of bandwidth; the aforementioned bandwidths include cellular bandwidths and non-cellular bandwidths. By way of non-limiting examples, a device type includes a machine type (e.g., phone, tablet computing device, laptop, server, desktop computer), a number of processor cores, an amount of memory in the device, a number of antennas coupled to a cellular interface of the device, a number of antennas coupled to a non-cellular interface of the device, and an operating system type. By way of non-limiting examples, a node-state signal (e.g., a beacon signal) contains information regarding a number of hops between the device and a cellular base station, an identifier of a cellular network operator, signal strength of a cellular base station at a gateway device or at a sink device, a location of the device, movement of the device, available cellular/non-cellular bandwidth for hopping, a number of hops, estimated path loss, a channel quality indicator, a number of cellular base stations available, a ratio of energy-per-bit to noise-per-bit, signal quality, an RSSI value, an RCPI value, and a number of wireless devices already participating in a channel. By way of non-limiting examples, a level of mobility includes sensing through components of a wireless device, detecting position and changes of position, and calculating a Doppler shift of wireless signals received by the wireless device. By way of non-limiting examples, a time of day includes the time relative to usage profiles and a time relative to busy hours. By way of non-limiting examples, subscription fees include an amount that the device user has promised to pay a cellular network operator. By way of non-limiting examples, user profiles includes user behaviors, a user's relationship with the cellular network operator, a type of customer (e.g., long-term customer, or pay-on-the go customer), and a number of years having used the network service provider. By way of non-limiting examples, an interference level includes cellular interference levels and non-cellular interference levels.

Interface

In some embodiments, the media, devices, networks, systems, and methods described herein include using one or more interfaces for cellular, non-cellular, and/or beaconing communications. An interface is a hardware module, implemented by an electronic circuitry, to generate and receive an electromagnetic wave. In some cases, the implementation of the interface belongs to part of an electronic circuitry. By way of a non-limiting example, the electromagnetic wave comprises a radiofrequency wave, a light beam, and/or an infrared wave. In some cases, the interface further includes an electronic circuitry for controlling the electromagnetic waveform modulation, demodulation, encoding, decoding, generation, and/or receiving. The controlling mechanisms are implemented by a hardware module, by a software module, or by a combination of hardware and software modules.

In cellular communications, a cellular interface is the interface for connecting a device to a cellular base station. The cellular interface is able to perform a cellular communication with a required protocol. In some embodiments, the cellular interface is dynamically configured to execute distinct cellular communication technologies and protocols, by way of non-limiting examples, such as Global System for Mobile Communications (GSM), General Packet Radio Service (GPRS), Enhanced Data Rates for GSM Evolution (EDGE), Universal Mobile Telecommunications System (UMTS), Code Division Multiple Access (CDMA), Wideband Code Division Multiple Access (W-CDMA), High Speed Packet Access (HSPA), Long Term Evolution (LTE), Long Term Evolution Advanced (LTE Advance), Long Term Evolution Direct (LTE Direct), and Worldwide Interoperability for Microwave Access (WiMAX).

In some embodiments, the media, devices, networks, systems, and methods described herein include using a non-cellular interface for non-cellular network connections. The non-cellular interface is able to perform a required protocol to connect itself to another device in a non-cellular network. In the industry of information technology, non-cellular interfaces are frequently referred to as wireless interfaces. Examples of non-cellular networks include, but not limited to, wireless local area networks, wireless wide area networks, Bluetooth networks, and infrared networks. In some embodiments, the non-cellular interface is dynamically configured to execute one or more distinct non-cellular communication technologies and protocols, by way of non-limiting examples, such as IEEE 802.11 standards, IEEE 802.16 standards, AP/STA protocols, Independent Basic Service Set (MSS), Peer-to-Peer (P2P), P2P-GO/P2P-Client, Long Term Evolution Direct (LTE Direct), Worldwide Interoperability for Microwave Access (WiMAX), IEEE 802.16, Mobile Multi-Hop Relay (MMR) Bluetooth, and FlashLinQ.

In some embodiments, the media, devices, networks, systems, and methods described herein include using a beacon interface for sending and receiving beacon signals. In certain embodiments, the beacon interface is the same as a non-cellular interface, or a cellular interface. In other embodiments, the beacon interface shares part of the circuitry of a non-cellular interface or a cellular interface. Alternatively, the beacon interface is an isolated circuitry independent of a cellular interface and independent of a non-cellular interface, such as, by way of non-limiting examples, devices under standards of IEEE 802.11p standard, LTE-Direct, and FlashLinQ.

Virtual Interface

In some embodiments, the media, devices, networks, systems, and methods described herein include using one or more interfaces of a sink/relaying/node device for cellular, non-cellular, and/or beaconing communications. An interface comprises a hardware module, software module, or a combination of hardware and software modules. However, appropriately controlling the interface and scheduling various tasks running on the interface can virtually create multiple interfaces on the wireless device, allowing the interface to simultaneously execute different tasks. The tasks include, by way of non-limiting examples, transmitting/receiving beacon signals, establishing wireless links, maintaining wireless links, routing data frames, switching data frames, directing data frames, readdressing data frames, reassembling data frames, and handling one or more protocols. The tasks are realized by another hardware module, or they are implemented by a software module.

In an embodiment, a non-cellular/wireless interface contains common resources for the purpose of non-cellular communication, which include, by way of non-limiting examples, signal processors, antennas, oscillators, resonators, amplifiers, transmitters, receivers, modulators, demodulators, encoders, decoders, logic components, and/or bus connections. The subject matter described herein can configure the common resource to perform multiple tasks in parallel. This process is equivalent to creating virtual non-cellular interfaces where each virtual non-cellular interface can execute an independent task. By way of non-limiting examples, the virtual interface can connect to a non-cellular access point using the STA protocol, the virtual interface can connect to a wireless device using the P2P-GO or P2P-Client protocol, and the virtual interface can connect to another wireless device using the AP or STA protocol. Those of skill in the art can recognize various communication protocols to be implemented on a virtual interface.

In some embodiments, one virtual non-cellular interface is created for handling a communication with an access point, and another virtual cellular interface is created for transferring/relaying/originating data communication. In some embodiments, more than two non-cellular virtual interfaces are created, where a third non-cellular virtual interface is used to communicate with another access point or to communicate with one or more downstream devices.

In some embodiments, a cellular interface contains common resources for the purpose of cellular communication. The resources include, by way of non-limiting examples, signal processors, antennas, oscillators, resonators, amplifiers, transmitters, receivers, modulators, demodulators, encoders, decoders, logic components, and/or bus connections. The subject matter described herein can configure the common resources to perform multiple tasks in parallel. This process is equivalent to creating virtual cellular interfaces, where each virtual cellular interface can execute an independent task. By way of non-limiting examples, the virtual interface can connect to a cellular base station using the HSPA protocol, the virtual interface can connect to another cellular base station using LTE protocol, and the virtual interface can perform a beaconing task.

In some embodiments, one virtual cellular interface is created for handling voice communication, and another virtual cellular interface is created for handling data communication.

In some embodiments, a wireless device (e.g., sink device, relaying device, and/or originating device) in a communication path utilizes two or more virtual interfaces to create multiple links which concurrently operate distinct protocols or the same protocol for linking another wireless device (e.g., a downstream device, an upstream device, and/or another non-cellular station/access point).

Wireless Links

In some embodiments, the media, devices, networks, systems, and methods described herein comprise establishing and/or maintaining a wireless link. Establishing/maintaining a wireless link is performed by an interface or by a virtual interface. Concurrently establishing/maintaining two or more wireless links is performed by two or more virtual interfaces that are configured on a single interface. Establishing/maintaining a wireless link comprises transmitting wireless signals and receiving wireless signals until the end of a communication session. Establishing/maintaining a wireless link comprises transmitting wireless signals and receiving wireless signals until the end of a communication session. Transmitting wireless signals includes, but not limited to, dissembling data files into data packets, encoding the data, modulating bit streams, and/or generating electromagnetic waves. Receiving wireless signals includes, but not limited to, receiving electromagnetic waves, demodulating waves, decoding bit streams, and/or assembling data packets into data files. In further embodiments, establishing wireless links is conditioned on some conditions. By way of non-limiting examples, suitable conditions are battery life, bandwidth usages, device types, node-state signals, levels of mobility, time of day, subscription fees, user profiles, non-cellular signal strengths, cellular signal strengths, noise levels, and/or interference levels. By way of non-limiting examples, a battery life includes an amount of energy available, an amount of battery storage capacity, an amount of remaining unexhausted energy, an estimated use of time/energy for conducting hopping, the current usage pattern of batteries, an absolute amount of energy stored, an amount of fluid remaining in a reservoir (e.g., an amount of hydrogen or methane in a fuel cell). By way of non-limiting examples, bandwidth usages include available bandwidth for establishing wireless links, an uplink available bandwidth, a downlink available bandwidth, and an estimated usage of bandwidth; the aforementioned bandwidths include cellular bandwidths and non-cellular bandwidths. By way of non-limiting examples, a device type includes a machine type (e.g., phone, tablet computing device, laptop, server, desktop computer), a number of processor cores, an amount of memory in the device, a number of antennas coupled to a cellular interface of the device, a number of antennas coupled to a non-cellular interface of the device, and an operating system type. By way of non-limiting examples, a node-state signal (e.g., a beacon signal) contains information regarding a number of hops between the device and a cellular base station, an identifier of a cellular network operator, signal strength of a cellular base station at a gateway device or at a sink device, a location of the device, movement of the device, available cellular/non-cellular bandwidth for hopping, a number of hops, estimated path loss, a channel quality indicator, a number of cellular base stations available, a ratio of energy-per-bit to noise-per-bit, signal quality, an RSSI value, an RCPI value, and a number of wireless devices already participating in a channel. By way of non-limiting examples, a level of mobility includes sensing through components of a wireless device, detecting position and changes of position, and calculating a Doppler shift of wireless signals received by the wireless device. By way of non-limiting examples, a time of day includes the time relative to usage profiles and a time relative to busy hours. By way of non-limiting examples, subscription fees include an amount that the device user has promised to pay a cellular network operator. By way of non-limiting examples, user profiles include user behaviors, a user's relationship with the cellular network operator, a type of customer (e.g., long-term customer, or pay-on-the go customer), and a number of years having used the network service provider. By way of non-limiting examples, an interference level includes cellular interference levels and non-cellular interference levels.

In some embodiments, a wireless device requests another device to relay a cellular communication. The request explicitly sends out a signal, or is embedded in a protocol. The request is implemented in the physical level or in the software level. The request is conditioned on some of the aforementioned conditions.

Gateway

Figure 2:
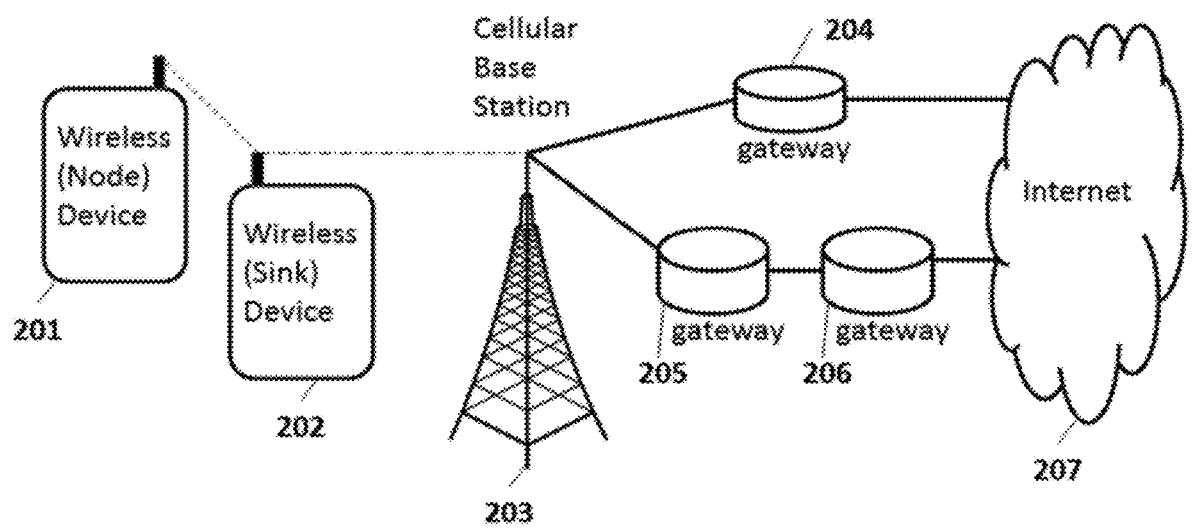
FIG. 2 shows a non-limiting example of a multi-hop, hybrid network; in this case, the node device hops onto a sink device which in turn relays the signals to the cellular base station and one or more than one gateway in the cellular network.

In some embodiments, the media, devices, networks, systems, and methods described herein include a computing device as a gateway for data communication. When a wireless node device connects to a base station via a single-hopping (i.e., direct) link or a multi-hopping (i.e., indirect) link via a sink device, the base station will further communicate with a gateway in the core cellular network. The gateway further communicates with the Internet directly or indirectly. Referring to FIG. 2, when a node device 201 connects to a cellular base station 203 via hopping onto a sink device 202, the base station can communicate with gateway 204 or 205 in the core network. In the case when the base station 203 connects to the gateway 204, the gateway directly communicates with the Internet 207. Alternatively, when the base station 203 connects to the gateway 205, the gateway 205 further communicates with another gateway 206 that further processes data and connects directly to the Internet 207. Those with skills in the art can recognize that various layouts can be deployed in the network configurations, and one or more gateways can be placed in the network to conduct the subject matter described herein.

By way of non-limiting examples, suitable gateways are Internet protocol security (IPsec) gateway, packet data network gateway (PGW; sometimes referred to as PDN gateway or packet gateway), serving gateway (SGW), evolved packet data gateway (ePDG), gateway GPRS support node (GGSN), serving GPRS support node (SGSN), and tunnel termination gateway (TTG). In some embodiments, the gateways include the function of proxy servers, domain name servers, firewalls, routers, and switches.

Secure Data Communication

In some embodiments, the media, devices, networks, systems, and methods described herein include creating a security tunnel for data communication. The hopping methods allow node devices to join the cellular networks via non-cellular networks. However, the relaying devices transferring the data communication between the node devices and the cellular networks may eavesdrop signals and data packets. Therefore, when multi-hop takes place, in order to secure data communication a security tunnel is created between the node devices and the cellular network.

Figure 3:
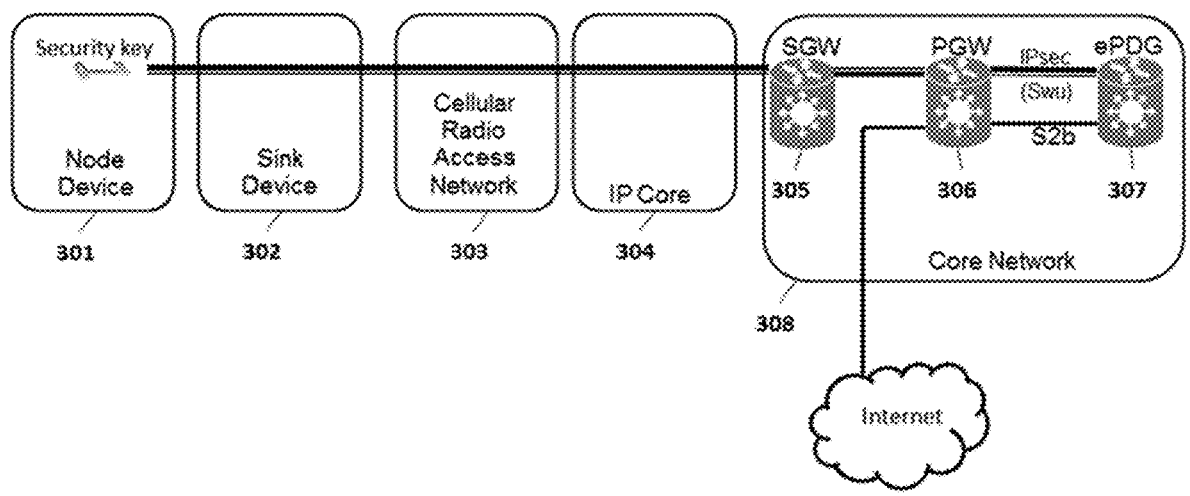
FIG. 3 shows a non-limiting example of a configuration of a hybrid network; in this case, the node device creates a security tunnel with the ePDG gateway.

Referring to FIG. 3 where in some embodiments a node device 301 does not have optimal cellular signals, the node device connects directly to the cellular radio access network 303 to obtain a security key. Alternatively, the node device 301 is pre-configured (non-limiting examples include: by the cellular network, by a cellular operator, by an end-user, and/or by a certificate authority) with a security key (non-limiting examples include: a fixed security key and/or a time-varying security key). The node device 301 then connects to a sink device 302 via a single hop or multiple hops in order to obtain a higher quality of cellular communication resources. Alternatively, the node device 301 is unable to get a security key before hopping to the sink device 302, so it needs to start with hopping onto the sink device 302 in order to obtain a security key from the cellular network. Non-limiting examples where the node device 301 has to perform hopping to get a security key include: the node device 301 comprises a wireless device that does not contain a cellular interface for cellular communication; the node device 301 comprises a wireless device in a basement where cellular signals cannot be reached at all.

Following the previous embodiments, the security key is then used to create a security tunnel between the node device 301 and the evolved packet data gateway (ePDG) 307. Once the security tunnel is created, the node device encrypts the data packets and sends the encrypted data packets to ePDG 307. In some embodiments, the secure communication between the node device 301 and ePDG 307 goes through other gateways, by way of non-limiting examples, such as serving gateway 305 and/or packet gateway 306. The ePDG 307 further decrypts the encrypted data packets and send the data packets to the Internet. In some embodiments, the data transmitted to the Internet is sent via another gateway. Referring to FIG. 3, data packets are sent to packet gateway 306 using S2b protocol and then to the Internet.

In some embodiments (see FIG. 3) when data packets are sent from the Internet to the node device 301, the ePDG 307 first receives the packets, directly from the Internet or via the packet gateway 306. Then, the ePDG 307 encrypts the data packets and transmits the encrypted data packets to the node device 301 through the security tunnel. When the node device 301 receives the encrypted data packets, it uses the security key to decrypt the packets.

In further embodiments, the transmission of data packets between the node device 301 and the gateways involve billing the user of the node device the amount of data packets being sent and received. Using the hopping technologies, the sink devices 302 also relay the same amount of data packets sent and received by the node devices, and the packet gateway 306 add a billing record for the sink device 302. However, the courtesy of the sink device 302 should not be billed for the amount of relayed data. Therefore, the ePDG 307 further request the packet gateway 306 and/or serving gateway 305 to delete billing records of the sink device 302.

In some embodiments in FIG. 3, the ePDG 307 communicate with the Internet directly, namely without via the packet gateway 306. The ePDG 307 request the packet gateway 306 and/or the service serving gateway 305 to add billing records for the node device 301 in addition to requesting the deletion of the billing records of the sink device 302.

In some embodiments, the media, devices, networks, systems, and methods described herein include a deep packet inspection scheme. Referring to FIG. 3, once the node device 301 receives a security key, a security tunnel can be created between the node device 301 and the ePDG 307. Thus, the node device 301 can encrypt data packets and transmit the data packets over the security tunnel. When the packet gateway 306 receives data packets, it does not add a billing record of the sink device 302, because the destination of the data packets is the ePDG 307; the packet gateway 306 further transfers the data packets to the ePDG 307. When the ePDG 307 receives the data packets, it decrypts the data packets and updates its network connection tables (non-limiting examples include: most recent path table, routing table, ARP table, and/or bearer table). The ePDG 307 sends the decrypted data packets over the S2b-bearers to the packet gateway 306, which sends the packets to the Internet.

In further embodiments, data packets are transmitted from the Internet to the node device 301. The packet gateway 306 receives the data packets from the Internet and sends them over the S2b-bearers to the ePDG 307. Once the ePDG 307 receives the data packets, it encrypts the data packets and sends the encrypted data packets over the security tunnel. Meanwhile, the ePDG 307 update the network connections tables. In the security tunnel, the packet gateway 306 receives the encrypted data packets from the ePDG 307. After inspection, the packet gateway 306 can know that the packets are being sent (e.g., to the node device 301) from the ePDG 307, so it does not add billing records for the sink device 302 and further sends the packets (e.g., to the node device 301) via the sink device 302. The node device 301 finally receives the data packets via the sink device 302, and decrypts the packets.

Figure 4:
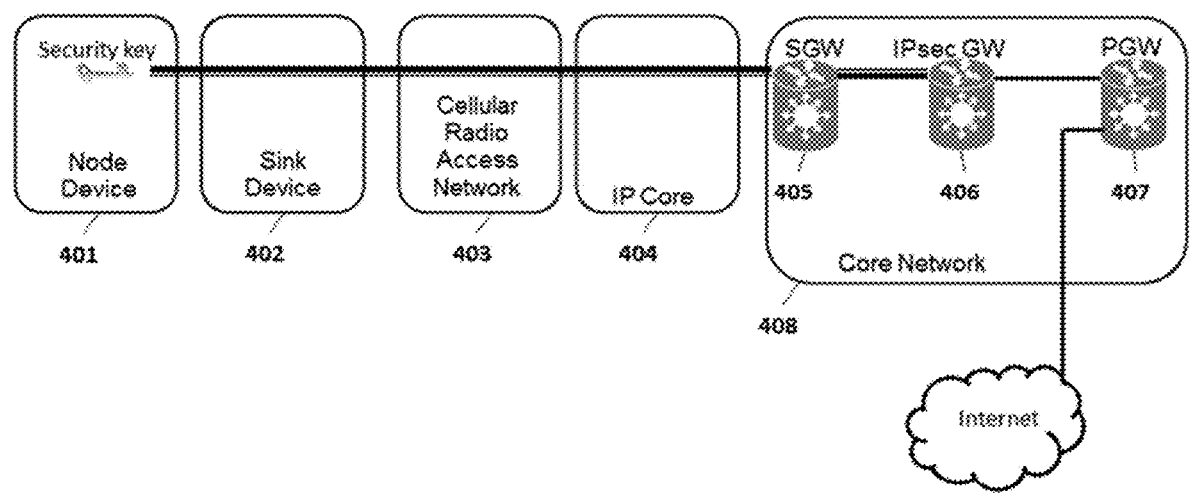
FIG. 4 shows a non-limiting example of a configuration of a hybrid network; in this case, the node device creates a security tunnel with the IP security gateway which is placed between the SGW and PGW gateways.

In some embodiments, the media, devices, networks, systems, and methods described herein place the gateway handling encryption and decryption in a different location. With reference to FIG. 4, the node device 401 non-cellular hopping onto the sink device 402 are embodied to create a security tunnel with an IPsec gateway 406, which is located between the serving gateway 405 and the packet gateway 407. When the node device 401 receives a security key, it can create a security tunnel with the IPsec gateway 406. Thus, the node device 401 can encrypt data packets and transmit the data packets over the security tunnel. When the IPsec gateway 406 receives the data packets, it decrypts the data packets and transmits the data packets to the Internet via packet gateway 407 using regular protocols; non-limiting examples include S2, S4, S5, and/or S8 protocols. When transmitting data packets from the Internet to the node device 401, the packet gateway 407 receives the packets and forwards the packets to the IPsec gateway 406. The IPsec gateway encrypts the data packets and sends them to the node device 401. The node device further decrypts the encrypted data packets. In some further embodiments, the IPsec gateway 406 communicates with: policy and charging rules function (PCRF) using regular protocols (non-limiting examples include Gxc or Gx protocols), mobility management entity (MME) using regular protocols (non-limiting examples include the S11 protocol), and/or 3GPP AAA server using regular protocols (non-limiting examples include the S6b protocol).

Figure 5:
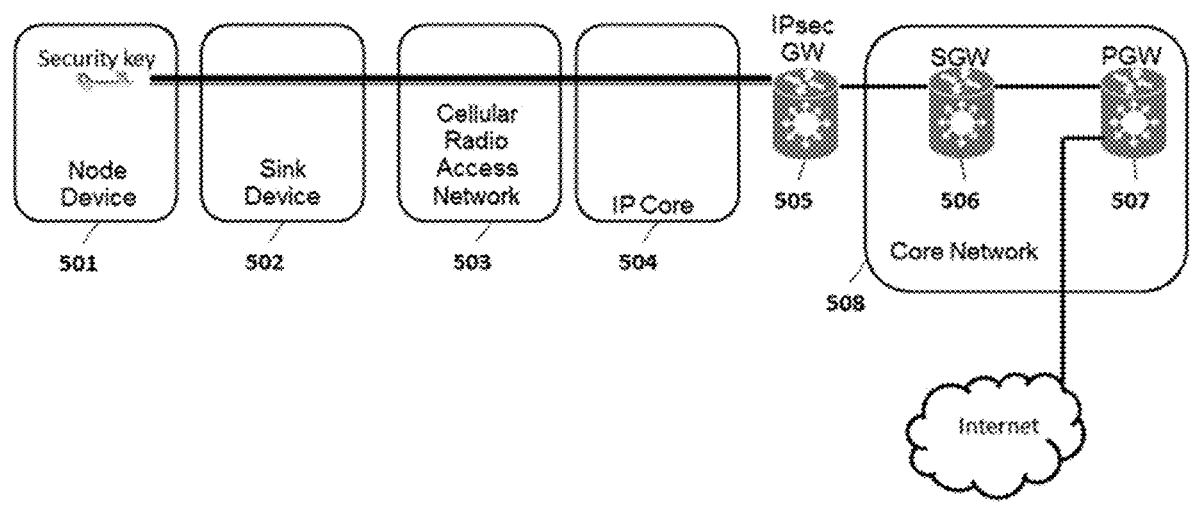
FIG. 5 shows a non-limiting example of a configuration of a hybrid network; in this case, the node device creates a security tunnel with the IP security gateway which is placed before the SGW and PGW gateways.

In the embodiments shown in FIG. 5, the node device 501 create a security tunnel with the IPsec gateway 505 that is placed before reaching the serving gateway 506 and the packet gateway 507. When the node device 501 receives a security key, it can create a security tunnel with the IPsec gateway 505. Thus, the node device 501 can encrypt data packets and transmit the data packets over the security tunnel. When the IPsec gateway 505 receives the data packets, it decrypts the data packets and transmits the data packets to the Internet via the serving gateway 506 and the packet gateway 507 using regular protocols (non-limiting examples include S1 and/or S4 protocols). When transmitting data packets from the Internet to the node device 501, the IPsec gateway 505 receives the packets via the serving gateway 506 and the packet gateway 507. The IPsec gateway 505 further encrypts the data packets and sends them to the node device 501 which finally decrypts the encrypted data packets. In some further embodiments, the IPsec gateway 505 communicate with: policy and charging rules function (PCRF) using regular protocols (non-limiting examples include the Gxc protocol), home subscriber server (HSS) using regular protocols (non-limiting examples include the S6a protocol), and/or mobility management entity (MME) using regular protocols (non-limiting examples include the S11 protocol).

Figure 6:
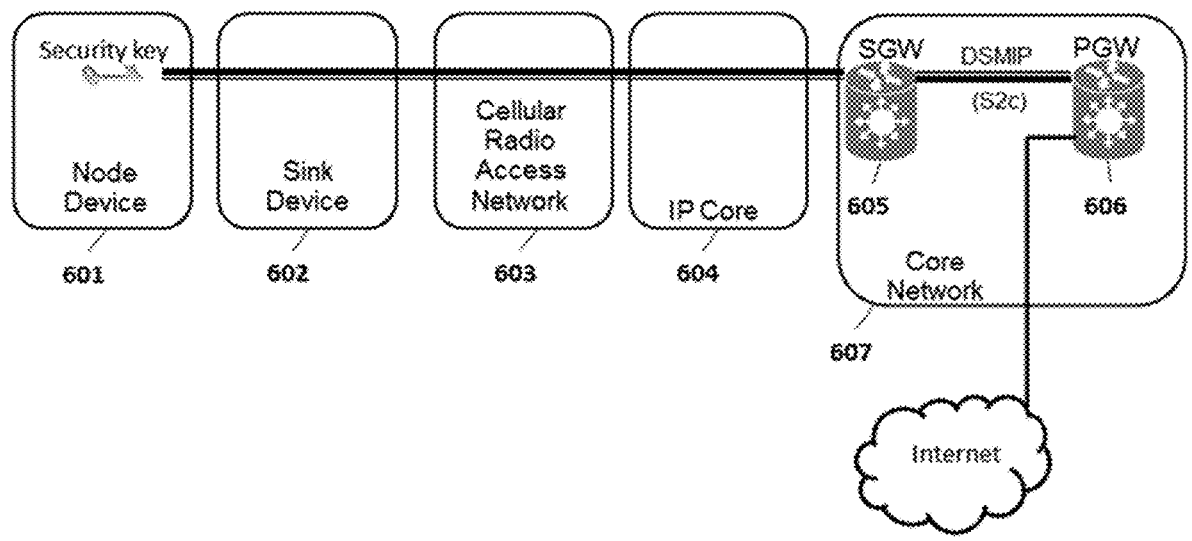
FIG. 6 shows a non-limiting example of a configuration of a hybrid network; in this case, the node device creates a security tunnel with the PGW gateway.

Alternatively, FIG. 6 shows some embodiments where only serving gateway and packet gateway are available in the core network. The node device 601 connects directly to the cellular radio access network 603 to obtain a security key. Alternatively, the node device 601 is pre-configured (non-limiting examples include: by the cellular network, by a cellular operator, by an end-user, and/or by a certificate authority) with a security key (non-limiting examples include: a fixed security key and/or a time-varying security key). The node device 601 then connects to a sink device 602 via a single hop or multiple hops in order to obtain a higher quality of cellular communication resources. Alternatively, the node device 601 not be able to get a security key before hopping to the sink device 602, so it needs to start with hopping onto the sink device 602 in order to obtain a security key from the cellular network. Non-limiting examples where the node device 601 has to perform hopping to get a security key include: the node device 601 comprises a wireless device that does not contain a cellular interface for cellular communication; the node device 601 comprises a wireless device in a basement where cellular signals cannot be reached at all.

Once the node device 601 receives a security key, it can create a security tunnel with the packet gateway 606, where the security tunnel utilize a tunneling protocol (non-limiting examples include: dual stack mobile IP (DSMIP [DSMIP can refer to the IPv4 version DSMIPv4, IPv6 version DSMIPv6, or a combination of DSMIPv4 and DSMIPv6]) and/or proxy mobile IP (PMIP [PMIP can refer to the IPv4 version PMIPv4, IPv6 version PMIPv6, or a combination of PMIPv4 and PMIPv6]) protocols). Thus, the node device 601 can encrypt data packets and transmit the data packets over the security tunnel. When the encrypted data packets arrive at the serving gateway 605, the serving gateway transfer the data to the packet gateway 606. The packet gateway decrypts the data packets and sends the packets to the Internet. When transmitting data packets from the Internet to the node device 601, the packet gateway 606 receives the packets and encrypts the packets. The encrypted data packets are sent to the node device 601 via the serving gateway 605 using regular protocols (non-limiting examples include DSMIP/S2c and/or PMIP/S2a protocols).

Some embodiments with deep packet inspection are applied to the network configuration in FIG. 6. Once the node device 601 obtains a security key, a security tunnel (e.g., on DSMIP protocol and/or PMIP protocol) can be created between the node device 601 and the packet gateway 606. Thus, the node device 601 can encrypt data packets and transmit the data packets over the security tunnel. When the packet gateway 606 receives the data packets, it does not add a billing record for the sink device 602, because the destination of the data packets is the packet gateway 606. The packet gateway 606 decrypts the data packets, updates its network connection tables (non-limiting examples include: most recent path table, routing table, ARP table, and/or bearer table), and sends the decrypted data packets to the Internet. When data packets are transmitted from the Internet to the node device 601, the packet gateway 606 receives the data packets, updates its network connection tables (non-limiting examples include: most recent path table, routing table, ARP table, and/or bearer table), encrypts the packets, and sends them to the node device 601. Because the data packets are sourced from the packet gateway, the packet gateway 606 does not add a billing record for the sink device 602. Finally, the node device receives the data packets and decrypts the packets.

The embodiments in FIG. 3, FIG. 4, FIG. 5, and FIG. 6 are non-limiting examples of possible network configurations. Those skilled in the art can easily recognize variations of the network configurations for creating security tunnels between a node device and a core cellular network.

Secure Communication and Roaming

In some embodiments, the media, devices, networks, systems, and methods described herein include a roaming mechanism. In some network configurations like FIG. 3, the node device 301 has direct access to the cellular network and the security tunnel is necessary. Then, the node device 301 perform the following tasks (in the order, in the reverse order, or in parallel): (1) connects directly to the cellular network and sends the data packets to the packet gateway 306; and (2) sends (e.g., indirectly via the sink device 302 over a security tunnel, or directly via the cellular network) a signaling to the ePDG 307 indicative of roaming from indirect-access (e.g., non-3GPP-access) to direct access (e.g., 3GPP-access). When the ePDG 307 receives the indicative signaling, it sends the indicative signaling and other signaling (e.g., to modify an S2b-bearer, to modify network connections tables) via regular protocols (e.g., the S2b-bearers) to the packet gateway 306. The packet gateway 306 perform the following tasks (in the order, in the reverse order, or in parallel): (1) receives the data packets from the node device 301 and transmits them to the Internet; and (2) receives all signaling from the ePDG 307 and update its network connection tables based on the received signaling. When the packet gateway 306 receives data packets from the Internet, it further transmits them to the node device 301.

In some embodiments, the roaming can take place along with security tunnels, as the following. Referring to FIG. 3, the node device 301 perform the following tasks (in the order, in the reverse order, or in parallel): (1) connects indirectly via the sink device 302 to the cellular network, creates a security tunnel with the ePDG 307, encrypts data packets, and sends the encrypted data packets to the ePDG 307; (2) sends (e.g., indirectly via the sink device 302 over the security tunnel, or directly via the cellular network) a signaling to the ePDG 307 indicative of roaming from direct-access (e.g., 3GPP-access) to indirect access (e.g., non-3GPP-access). The ePDG 307 perform the following tasks: (in the order, in the reverse order, or in parallel): (1) receives the encrypted data packets over the security tunnel from the node device 301, decrypts them, and sends them over regular protocols (e.g., the S2b-bearers) to the packet gateway 306; (2) receives the indicative signaling and sends the indicative signaling and other signaling (e.g., to modify an S2b-bearer, to modify network connections tables) via regular protocols (e.g., the S2b-bearers) to the packet gateway 306. The packet gateway 306 perform the following tasks (in the order, in the reverse order, or in parallel): (1) receives the decrypted data packets over the S2b-bearers from the ePDG 307 and sends them to the Internet; (2) receives all signaling from the ePDG 307 and update its network connection tables based on the received signaling. When the packet gateway 306 receives data packets from the Internet, it sends them over regular protocols (e.g., the S2b-bearers) to the ePDG 307, which in turn encrypts the data packets and sends the encrypted data packets over the security tunnel to the node device 301. Upon receiving the encrypted data packets, the node device 301 decrypts the data packets.

A roaming mechanism occurs to the embodiments in FIG. 6. Some network configurations like FIG. 6 have the node device 601 with direct access to the cellular network and the security tunnel is unnecessary. The node device 601 perform the following tasks (in the order, in the reverse order, or in parallel): (1) connects directly to the cellular network and sends the data packets to the packet gateway 606; and (2) sends (e.g., indirectly via the sink device 602 over a security tunnel, or directly via the cellular network) a signaling to the packet gateway 606 indicative of roaming from indirect-access (e.g., non-3GPP-access) to direct access (e.g., 3GPP-access). The packet gateway 606 perform the following tasks (in the order, in the reverse order, or in parallel): (1) receives the data packets from the node device 601 and transmits them to the Internet; and (2) receives signaling (e.g., to modify an 52c-bearer, to modify network connections tables) from the node device indicative of roaming from indirect-access (e.g., non-3GPP-access) to direct access (e.g., 3GPP-access) and update its network connection tables based on the received signaling. When the data packets are sent from the Internet to the node device 601, the packet gateway 606 receives the packets and transmits them to the node device.

In some embodiments, roaming can take place along with security tunnels, described as follows. Referring to FIG. 6, the node device 601 perform the following tasks (in the order, in the reverse order, or in parallel): (1) connects indirectly via the sink device 602 to the cellular network, creates a security tunnel with the packet gateway 606, encrypts data packets, and sends the encrypted data packets to the gateway 606; (2) sends (e.g., indirectly via the sink device 602 over the security tunnel, or directly via the cellular network) a signaling to the packet gateway 606 indicative of roaming from direct-access (e.g., 3GPP-access) to indirect access (e.g., non-3GPP-access). The packet gateway 606 perform the following tasks: (in the order, in the reverse order, or in parallel): (1) receives the encrypted data packets over the DSMIP security tunnel from the node device 601, decrypts them, and sends them to the Internet; (2) receives signaling (e.g., to modify an 52c-bearer, to modify network connections tables) from the node device 601 indicative of roaming from direct-access (e.g., 3GPP-access) to indirect access (e.g., non-3GPP-access) and update its network connection tables based on the received signaling. When packets are transmitted from the Internet to the node device 601, the packet gateway 606 receives the data packets from the Internet, encrypts the packets, and sends encrypted packets over the DSMIP tunnel to the node device 601. Upon receiving the encrypted data packets, the node device 601 decrypts the data packets.

Secure Communication and Inter Radio Access Technology

Figure 7:
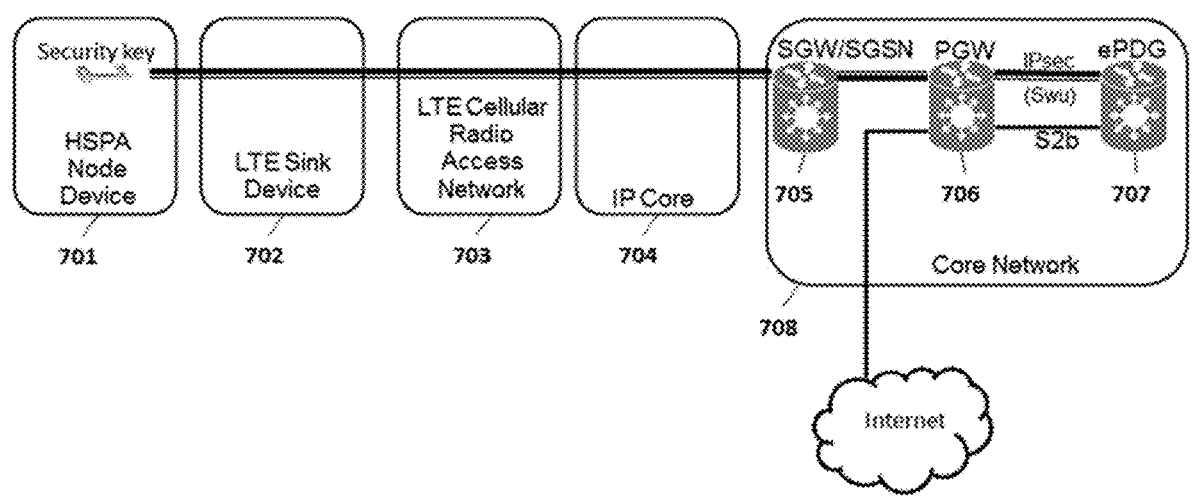
FIG. 7 shows a non-limiting example of a configuration of an inter-RAT hybrid network; in this case, the node device operates on the HSPA protocol and the cellular network operates on the LTE protocol with SGW, PGW, and ePDG gateways.
Figure 8:
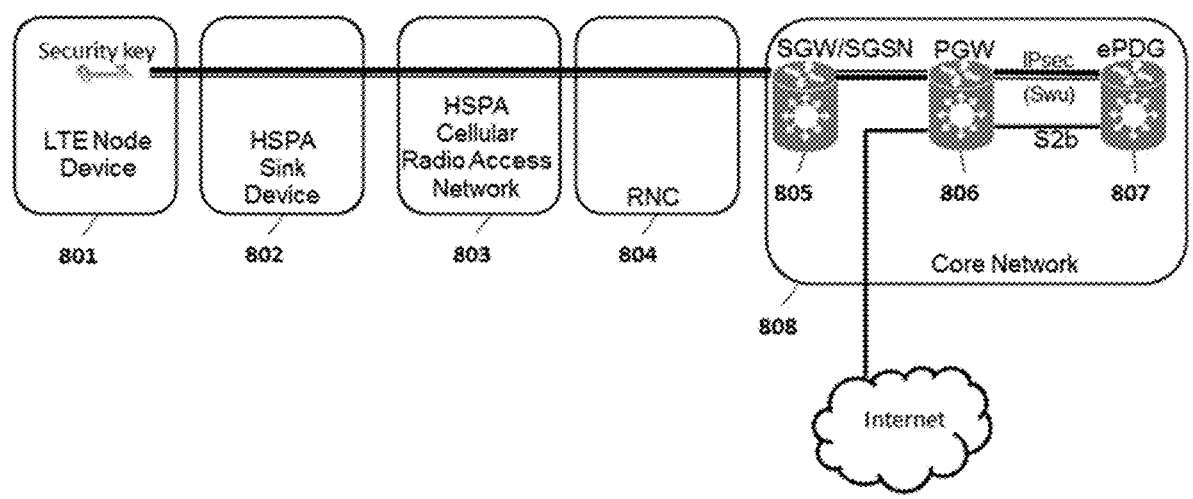
FIG. 8 shows a non-limiting example of a configuration of an inter-RAT hybrid network; in this case, the node device operates on the LTE protocol and the cellular network operates on the HSPA protocol with SGSN, PGW, and ePDG gateways.

In some embodiments, the media, devices, networks, systems, and methods described herein include Inter-Radio Access Technology (Inter-RAT). FIG. 7 and FIG. 8 show the counterpart embodiments of FIG. 3. In some cases shown in FIG. 7, the node device 701 be a high speed packet access (HSPA) device, and the sink device 702 and the radio access network 703 be running long term evolution (LTE) protocols. In addition to the SGW 705, there include an SGSN (e.g., that communicates with packet gateway 706 using regular protocols such as the S4 protocol) that serves HSPA devices that communicate directly with the cellular network. Alternatively, in other cases shown in FIG. 8, the node device 801 comprises an LTE device, the sink device comprises an HSPA device, and the cellular radio network access 803 and 804 is HSPA. In addition to the SGSN service serving gateway 805, there is an SGW (e.g., that communicates with packet gateway 806 using regular protocols such as S5 and/or S8 protocols) that serves LTE devices that communicate directly with the cellular network.

Figure 9:
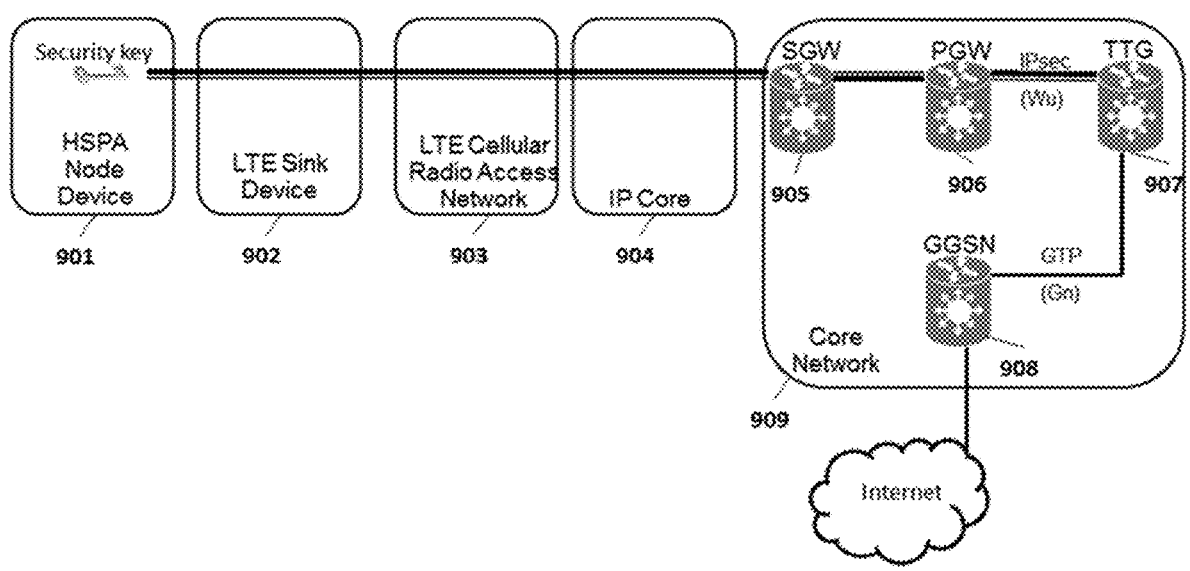
FIG. 9 shows a non-limiting example of a configuration of an inter-RAT hybrid network; in this case, the node device operates on the HSPA protocol and the cellular network operates on the LTE protocol with SGW, PGW, TTG, and GGSN gateways.

FIG. 9 shows some embodiments under inter-RAT. In the embodiments, the node device 901 is an HSPA device. The sink device 902 is an LTE device and the network 903-906 operates on LTE. The node device 901 can create a security tunnel with tunnel termination gateway (TTG) 907, after the node device 901 receives a security key. Thus, the node device 901 can encrypt data packets and transmit the data packets over the security tunnel. When the TTG 907 receives data packets, it decrypts the data packets and forwards the data packets over regular protocols, for instance, GPRS tunneling protocol (GTP) to gateway GPRS support node (GGSN) 908, which in turn sends the packets to the Internet. When transmitting data packets from the Internet to the node device 901, the GGSN 908 receives the packets and forwards the packets over regular protocols (e.g., the GTP protocol) to the TTG 907. The TTG encrypts the data packets and sends them to the node device 901 over the security tunnel. The node device further decrypts the encrypted data packets.

In further embodiments of FIG. 9, the transmission of data packets between the node device 901 and the gateways involve billing the user of the node device the amount of data packets being sent and received. Using the hopping technologies, the sink devices 902 also relay the same amount of data packets sent and received by the node devices, and the packet gateway 906 adds a billing record for the sink device 902. However, the courtesy of the sink device 902 should not be billed for the amount of relayed data. Therefore, the TTG 907 further requests the packet gateway 906 to delete billing records of the sink device 902.

Figure 10:
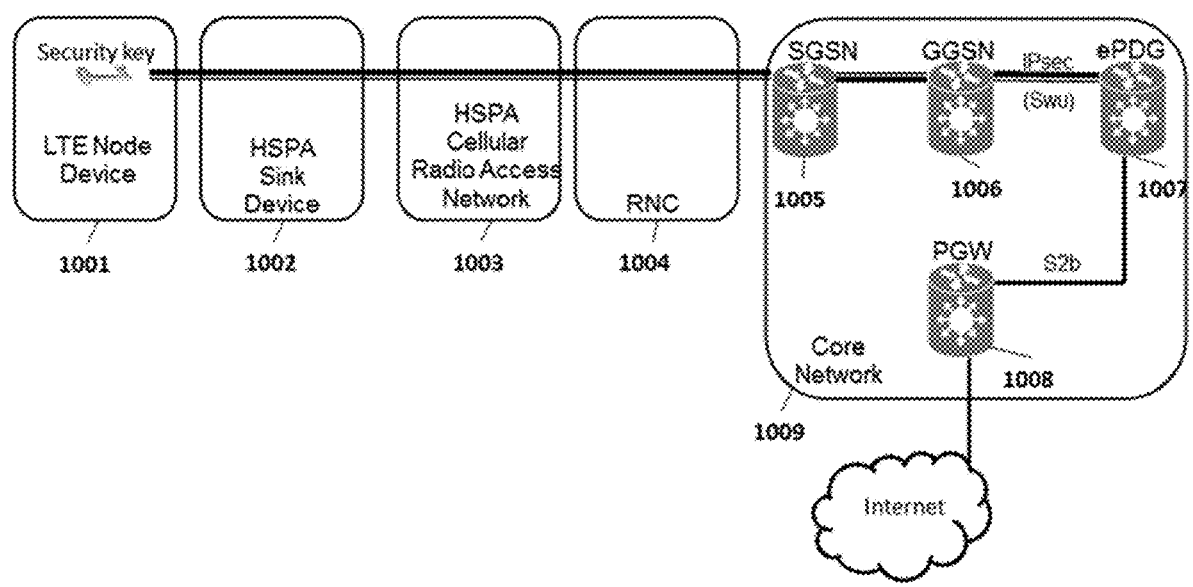
FIG. 10 shows a non-limiting example of a configuration of an inter-RAT hybrid network; in this case, the node device operates on the LTE protocol and the cellular network operates on the HSPA protocol with SGSN, GGSN, ePDG and PGW gateways.

FIG. 10 shows some embodiments under inter-RAT. In the embodiments, the node device 1001 is an LTE device. The sink device 1002 is an HSPA device and the network 1003-1006 operates on HSPA. The node device 1001 can create a security tunnel with ePDG 1007 after receiving a security key. Thus, the node device 1001 can encrypt data packets and transmit the data packets over the security tunnel. When the ePDG 1007 receives data packets, it decrypts the data packets and forwards the data packets over regular protocols (e.g., the S2b protocol) to packet gateway 1008, which in turn sends the packets to the Internet. When transmitting data packets from the Internet to the node device 1001, the packet gateway 1008 receives the packets and forwards the packets to the ePDG 1007. The ePDG encrypts the data packets and sends them to the node device 1001 over the security tunnel. The node device further decrypts the encrypted data packets.

In further embodiments of FIG. 10, the transmission of data packets between the node device 1001 and the gateways involve billing the user of the node device the amount of data packets being sent and received. Using the hopping technologies, the sink devices 1002 also relay the same amount of data packets sent and received by the node devices, and the GGSN 1006 adds a billing record for the sink device 1002. However, the courtesy of the sink device 1002 should not be billed for the amount of relayed data. Therefore, the ePDG 1007 further requests the GGSN 1006 to delete billing records of the sink device 1002.

Figure 11:
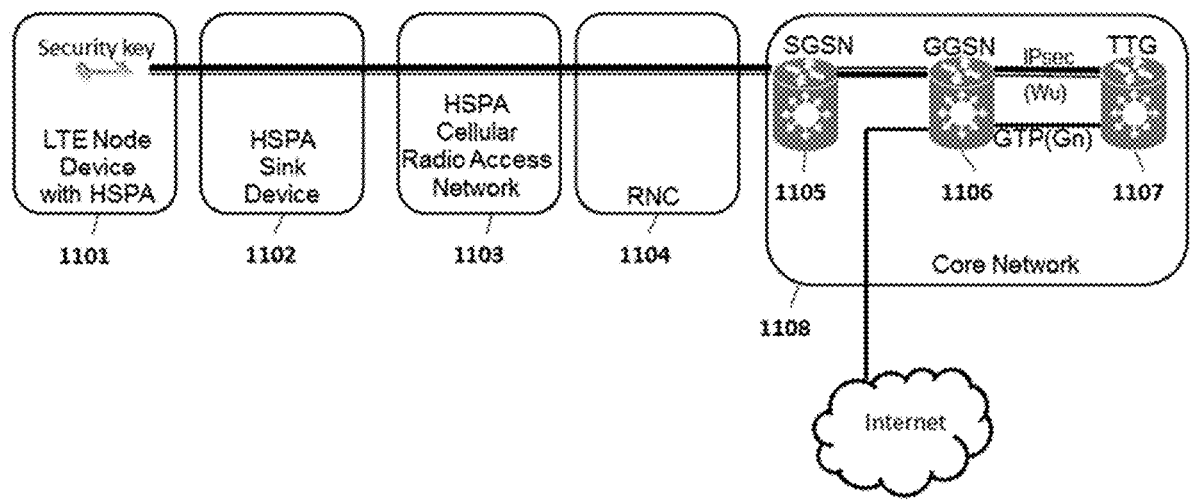
FIG. 11 shows a non-limiting example of a configuration of an inter-RAT hybrid network; in this case, the node device operates on the LTE protocol and the cellular network operates on the HSPA protocol with SGSN, GGSN and TTG gateways.

In some embodiments, the node devices have a capability to operate on more than one protocol under inter-RAT. Referring to FIG. 11, the node device 1101 is an LTE device with HSPA capability. The sink device 1102 is an HSPA device and the network 1103-1108 operates on HSPA. The node device 1101 can fallback from LTE to HSPA and create a security tunnel with TTG 1107 after receiving a security key. Thus, the node device 1101 can encrypt data packets and transmit the data packets over the security tunnel. When the TTG 1107 receives data packets, it decrypts the data packets and forwards the data packets over regular protocols (e.g., the GTP protocol) to GGSN 1106, which in turn sends the packets to the Internet. When transmitting data packets from the Internet to the node device 1101, the GGSN 1106 receives the packets and forwards the packets to the TTG 1107. The TTG further encrypts the data packets and sends them to the node device 1101 over the security tunnel. The node device finally decrypts the encrypted data packets.

In further embodiments of FIG. 11, the transmission of data packets between the node device 1101 and the gateways involve billing the user of the node device the amount of data packets being sent and received. Using the hopping technologies, the sink devices 1102 also relay the same amount of data packets sent and received by the node devices, and the GGSN 1106 adds a billing record for the sink device 1102. However, the courtesy of the sink device 1102 should not be billed for the amount of relayed data. Therefore, the TTG 1107 further requests the GGSN 1106 to delete billing records of the sink device 1102.

In some embodiments, those with skills in the art can recognize that inter-RAT can mix LTE and Enhanced Data rates for GSM Evolution (EDGE). In some embodiments of FIG. 7 and FIG. 9, the node devices change to operating on the EDGE protocol. In the embodiments of FIG. 8, FIG. 10 and FIG. 11, the cellular network becomes an EDGE network.

In some embodiments, those with skills in the art can recognize that inter-RAT can mix HSPA and EDGE standards. In some cases of FIG. 11, the node device operates on EDGE and the network operates on HSPA. In some cases of FIG. 11, the node device operates on HSPA and the network operates on EDGE.

Figure 12:
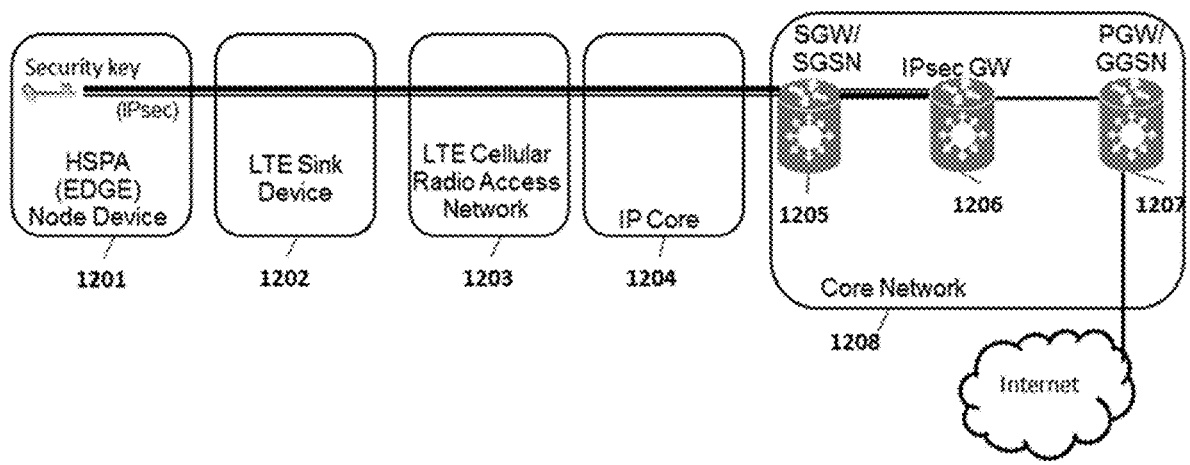
FIG. 12 shows a non-limiting example of a configuration of an inter-RAT hybrid network; in this case, the node device operates on the HSPA or EDGE protocol and the cellular network operates on the LTE protocol with SGW, IPsec and PGW gateways.
Figure 13:
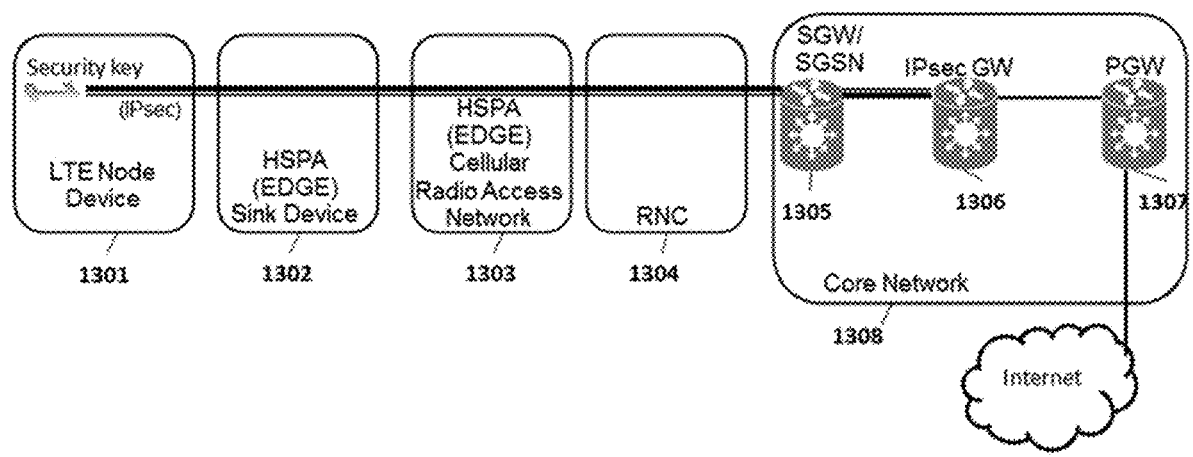
FIG. 13 shows a non-limiting example of a configuration of an inter-RAT hybrid network; in this case, the node device operates on the LTE protocol and the cellular network operates on the HSPA or EDGE protocol with SGW, IPsec and PGW gateways.
Figure 14:
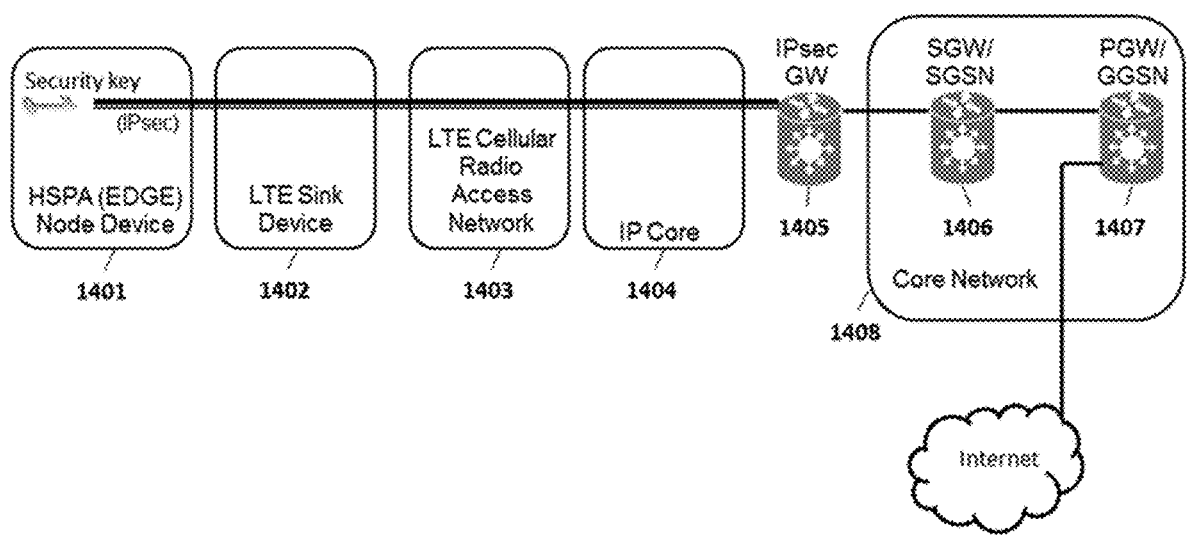
FIG. 14 shows a non-limiting example of a configuration of an inter-RAT hybrid network; in this case, the node device operates on the HSPA or EDGE protocol and the cellular network operates on the LTE protocol with the IPsec gateway placed before the SGW and PGW gateways.
Figure 15:
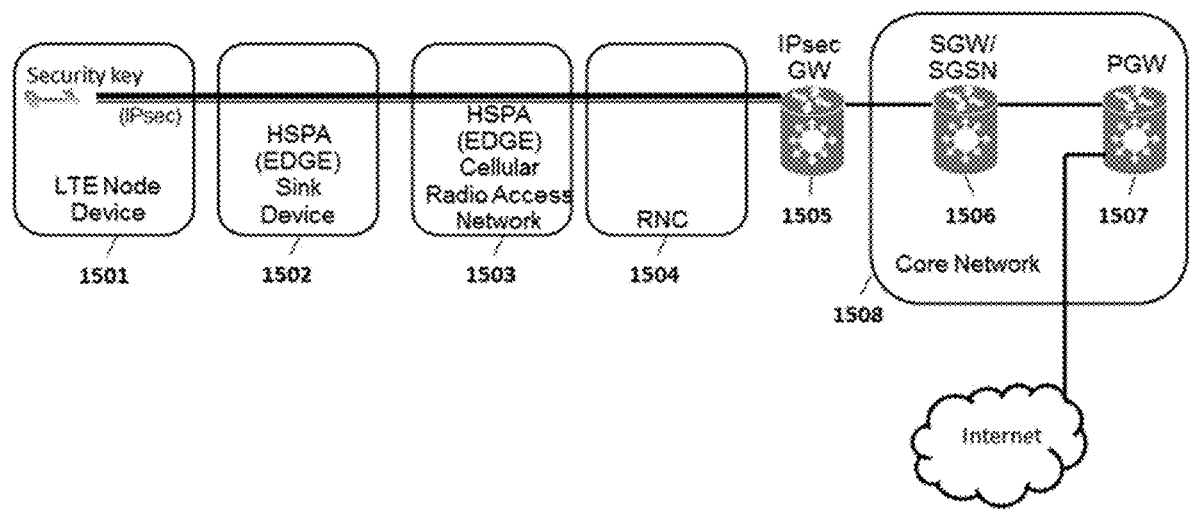
FIG. 15 shows a non-limiting example of a configuration of an inter-RAT hybrid network; in this case, the node device operates on the LTE protocol and the cellular network operates on the HSPA or EDGE protocol with the IPsec gateway placed before the SGW and PGW gateways.

Similarly, by way of non-limiting examples, embodiments of FIG. 4 in conjunction with inter-RAT are described below. Referring to FIG. 12, in some embodiments, the node device 1201 operates on HSPA or EDGE, the sink device 1202 and the cellular network 1203-1208 operates on LTE. In some cases, the serving gateway 1205 is replaced by an SGSN (e.g., that communicates with packet gateway 1207 using regular protocols such as the S4 protocol) serving HSPA/EDGE devices that communicate directly with the cellular network. In some cases, the packet gateway 1207 is replaced by a GGSN. In some embodiments shown in FIG. 13, the node device 1301 operate on LTE, the sink device 1302 and the cellular network 1303-1308 operate on HSPA or EDGE. In addition to the SGSN 1305, there is an SGW (e.g., that communicates with packet gateway 1307 using regular protocols such as S5 and/or S8 protocols) serving LTE devices that communicate directly with the cellular network. Sometimes, the combination of HSPA and EDGE be embodied: the node device 1301 operate on EDGE, the sink device 1302 and the cellular network 1303-1308 operate on HSPA, and the serving gateway 1305 be replaced by an SGSN; another option is that the node device 1301 operate on HSPA, the sink device 1302 and the cellular network 1303-1308 operate on EDGE, and the serving gateway 1305 be replaced by an SGSN By way of non-limiting examples, possible variations on FIG. 5 are described below. Referring to FIG. 14, in some embodiments, the node device 1401 operates on HSPA or EDGE, the sink device 1402 and the cellular network 1403-1408 operates on LTE. In addition to the SGW 1406, there is an SGSN (e.g., that communicates with packet gateway 1407 using regular protocols, for example the S4 protocol) that serves HSPA/EDGE devices that communicate directly with the cellular network. In some embodiments shown in FIG. 15, the node device 1501 operate on LTE, the sink device 1502 and the cellular network 1503-1508 operate on HSPA or EDGE. In addition to the SGSN 1506, there is an SGW (e.g., that communicates with packet gateway 1507 using regular protocols such as S5 and/or S8 protocols) that serves LTE devices that communicate directly with the cellular network. Moreover, the combination of HSPA and EDGE is embodied: the node device 1501 operates on EDGE, the sink device 1502 and the cellular network 1503-508 operates on HSPA, and the serving gateway 1506 is replaced by an SGSN; another option comprises that the node device 1501 can operate on HSPA, the sink device 1502 and the cellular network 1503-1508 operates on EDGE, and the serving gateway 1506 is replaced by an SGSN.

By way of non-limiting examples, possible variations on Figure bare described below. Referring to FIG. 6, in some embodiments, the node device 601 operates on HSPA, the sink device 602 and the cellular network 603-607 operates on LTE. In addition to the SGW 605, there is an SGSN (e.g., that communicates with packet gateway 606 using regular protocols [e.g., the S4 protocol]) that serves HSPA devices that communicate directly with the cellular network. In some embodiments, the node device 601 operates on LTE, the sink device 602 and the cellular network 603-607 operates on HSPA. In addition to the SGSN 605, there is an SGW (e.g., that communicates with packet gateway 606 using regular protocols [e.g., S5 and/or S8 protocols]) that serves LTE devices that communicate directly with the cellular network. In some cases, the node device 601 operates on EDGE, the sink device 602 and the cellular network 603-607 operates on LTE. In addition to the SGW 605, there is an SGSN (e.g., that communicates with packet gateway 606 using regular protocols [e.g., the S4 protocol]) that serves EDGE devices that communicate directly with the cellular network. Alternatively, the node device 601 operates on LTE, the sink device 602 and the cellular network 603-607 operates on EDGE. In addition to the SGSN 605, there is an SGW (e.g., that communicates with packet gateway 606 using regular protocols [e.g., S5 and/or S8 protocols]) that serves LTE devices that communicate directly with the cellular network. Moreover, HSPA and EDGE is embodied: the node device 601 operates on EDGE, the sink device 602 and the cellular network 603-607 operates on HSPA, and the serving gateway 605 is replaced by an SGSN; another option includes that the node device 601 can operate on HSPA, the sink device 602 and the cellular network 603-607 operates on EDGE, and the serving gateway 605 is replaced by an SGSN.

Most Recent Path Intelligence

In some embodiments, the media, devices, networks, systems, and methods described herein include most recent path intelligence. Various embodiments of most recent path intelligence are shown in FIG. 16, FIG. 17, and FIG. 18.

Figure 16:
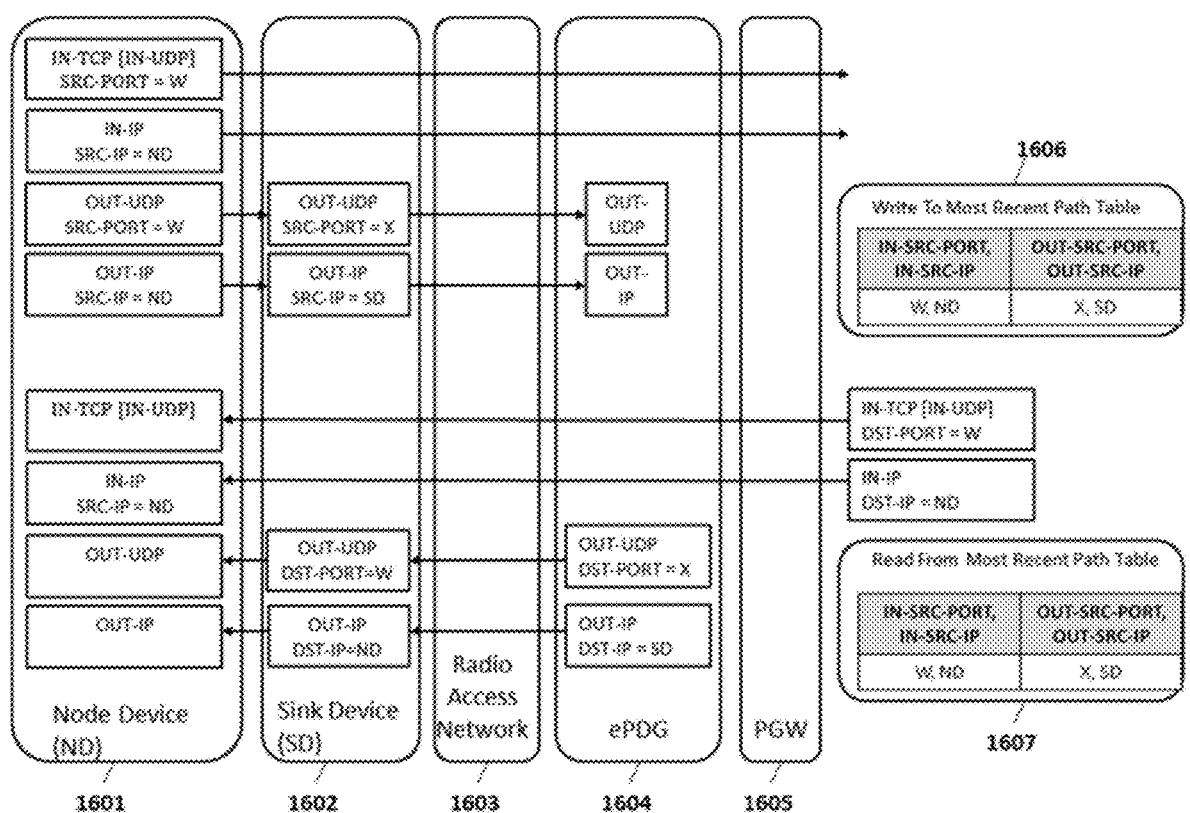
FIG. 16 shows a non-limiting example of most recent path intelligence; in this case, the ePDG handles the most recent path tables.

FIG. 16 shows a non-limiting example of most recent path intelligence; in this case, the ePDG handles the most recent path tables.

Figure 17:
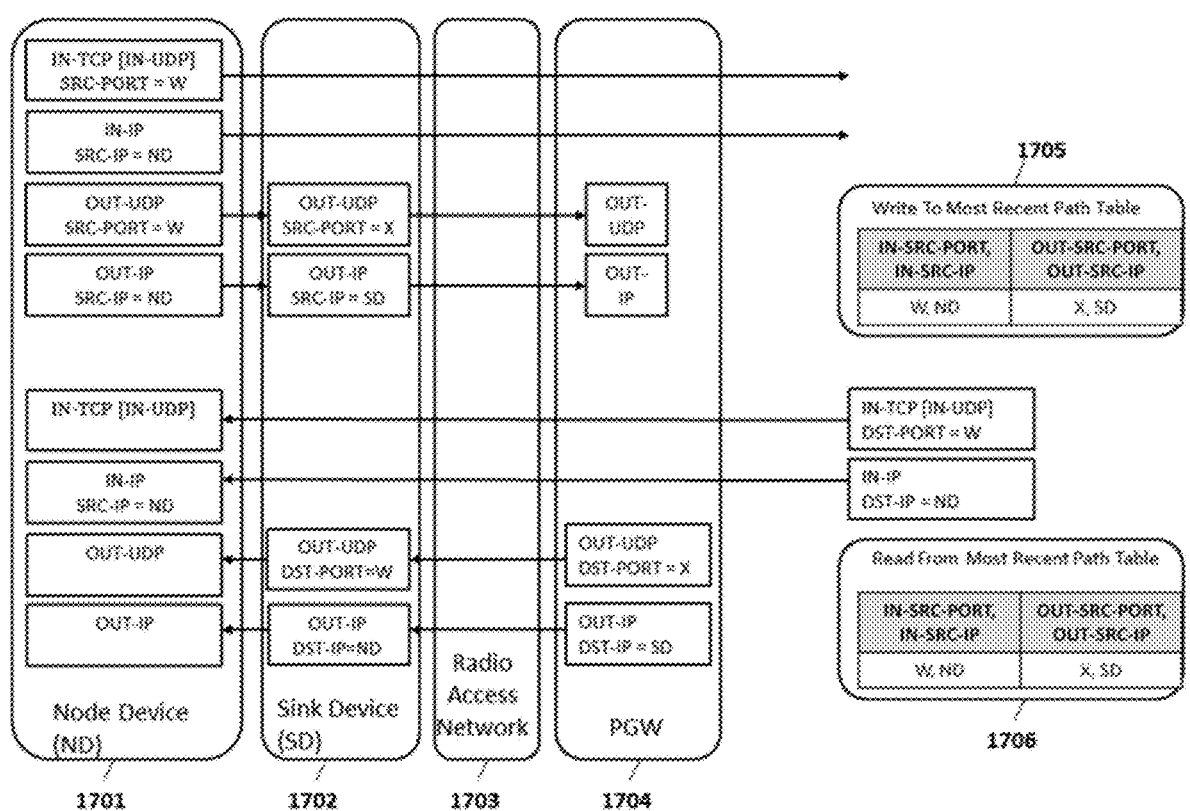
FIG. 17 shows a non-limiting example of most recent path intelligence; in this case, the PGW handles the most recent path tables.

FIG. 17 shows a non-limiting example of most recent path intelligence; in this case, the PGW handles the most recent path tables.

Figure 18:
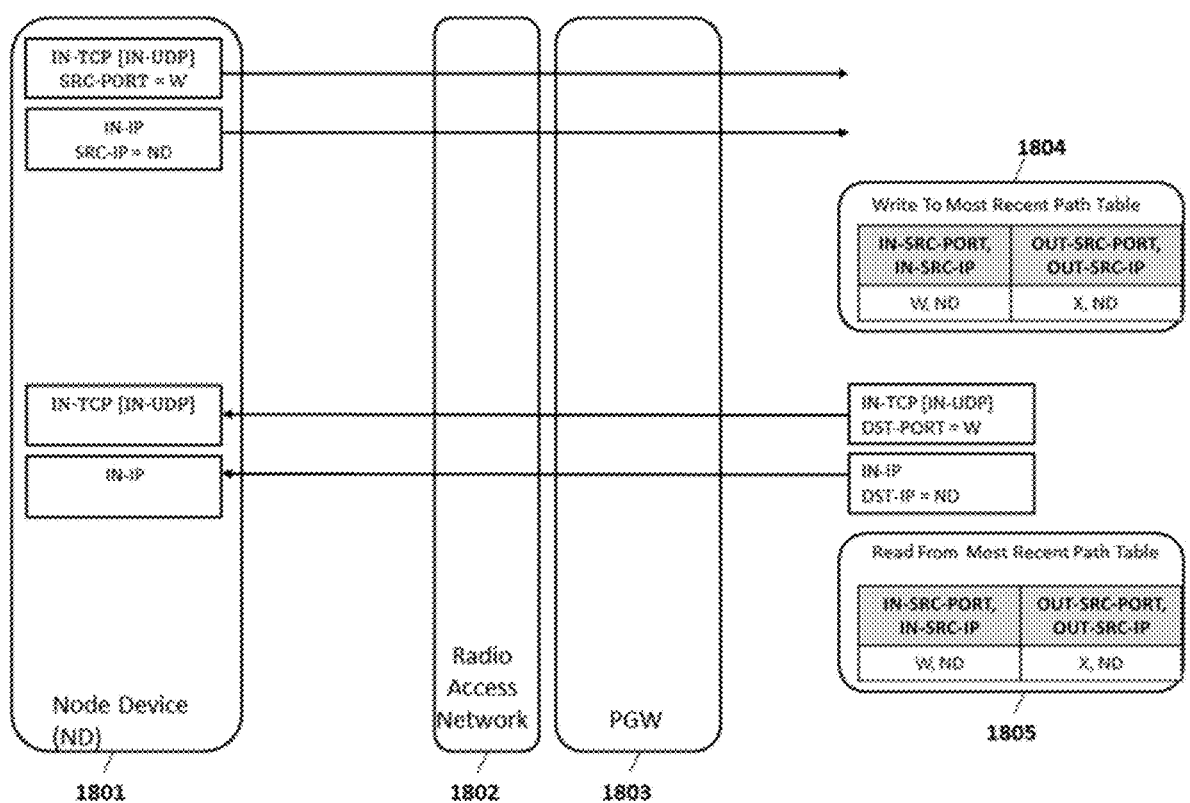
FIG. 18 shows a non-limiting example of most recent path intelligence; in this case, the node device has direct access to the cellular network and the PGW handles the most recent path tables.

FIG. 18 shows a non-limiting example of most recent path intelligence; in this case, the node device has direct access to the cellular network and the PGW handles the most recent path tables Alternating Tunnel Configurations In some embodiments, the media, devices, networks, systems, and methods described herein include alternating tunnel configurations to enhance data communication security. The subject idea is to create a dynamic scheme to enhance communication security, since a static scheme can be easily deciphered by a third party. In some embodiments, the node device can request to reissue a new security key from time to time, so the data encryption is dynamic. In some embodiments, the node device uses more than one sink device to communicate with the cellular network; the node device hops to different sink devices from time to time, so the communication path stays dynamic. In some embodiments, the node device requests to establish the security tunnel with distinct gateways from time to time. In some embodiments, the node device chooses one of the network configurations in FIG. 3, FIG. 4, FIG. 5, and FIG. 6; at a later time, the node device switches to another network configuration. Those with skills in the art can further recognize various combinations of the foregoing methods to enhance data communication security.

Figure 19:
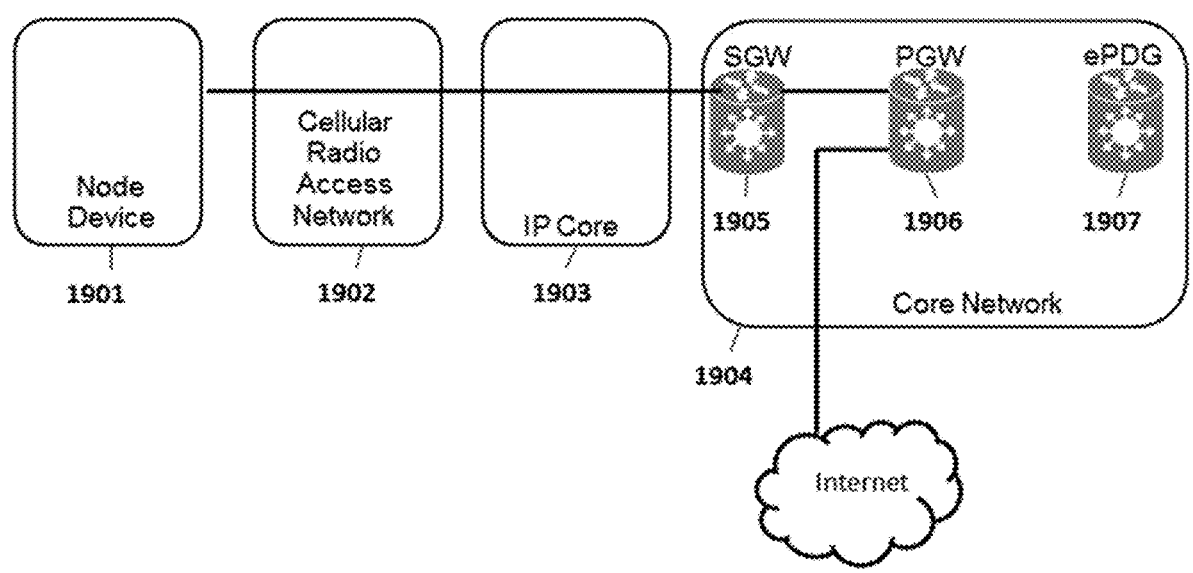
FIG. 19 shows a non-limiting example of a configuration of a hybrid network; in this case, the node device accesses the cellular network directly without hopping, and no security tunnel is created.

In some embodiments, a node device switches between using a security tunnel and not using a security tunnel. In some embodiments when a node device (e.g., a mobile device) moves to a location with a good cellular reception, it can directly connect to the cellular base station without hopping, directly or indirectly, to a sink device. In this case, the node device need not establish a secure tunnel and can use a regular cellular communication protocol to connect with the core cellular network. FIG. 19 shows the counterpart embodiments to FIG. 3 without a security tunnel. In the embodiments, the node device 1201 connects directly to the cellular network. Without a security tunnel, the data packets do not flow to the evolved packet data gateway 1207. To send data packets to the Internet, the communication path starts from the node device 1201, to the serving gateway 1205, to the packet gateway 1206, and to the Internet. To receive data packets, the communication path is in the reverse order. In further embodiments, the node device have an option to hop onto a sink device where a security tunnel has to be established, as shown in FIG. 3; thus, the node device can alternate the network configurations between FIG. 3 and FIG. 19.

Data Protocol

In some embodiments, the media, devices, networks, systems, and methods described herein include a data protocol associated with a security tunnel. In further embodiments, the data protocol includes billing records processing. The transmission of data packets between a node device and a gateway involves charging the user of the node device the amount of data packets being sent and received. Using the hopping technologies, a sink/relaying device allowing the node device to hop onto the non-cellular network also transfers the same amount of data packets sent and received by the node device. However, the courtesy of the sink/relaying device should not be billed for the amount of relayed data. Therefore, the data protocol requests a gateway to delete a billing record of the sink/relaying device.

Figure 20:
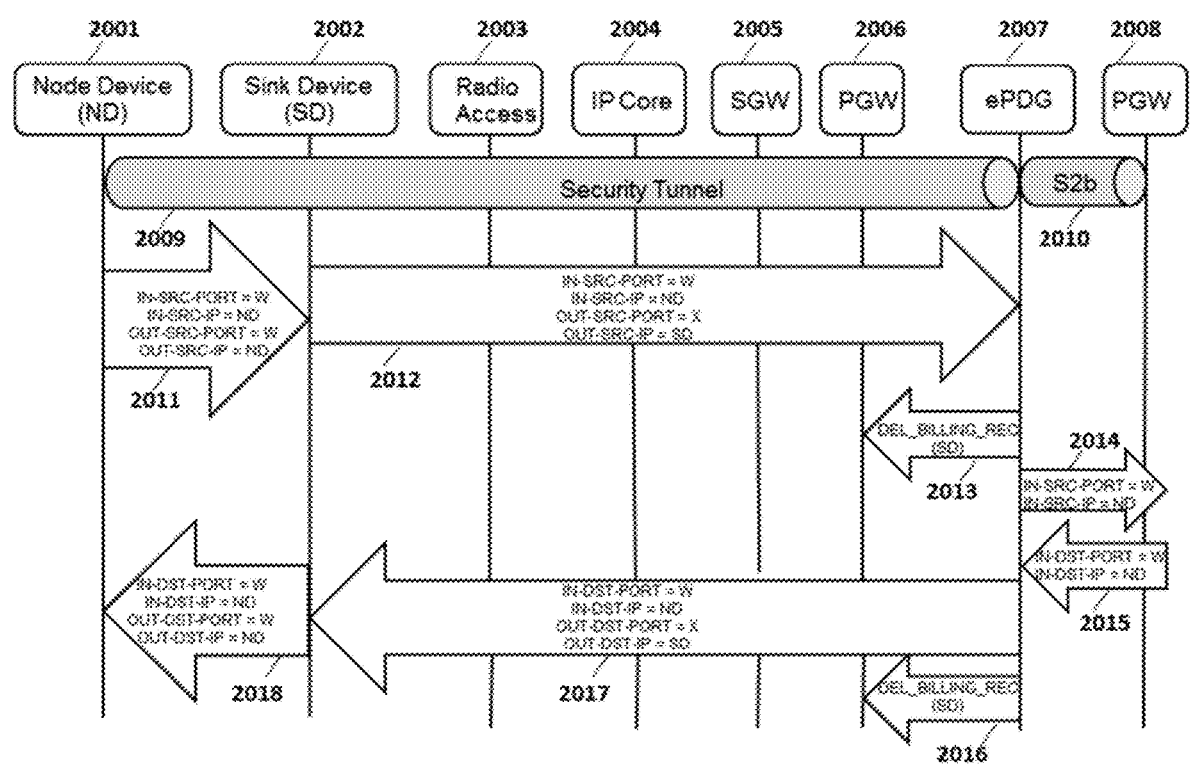
FIG. 20 shows a non-limiting example of a data protocol in a hybrid network; in this case, various devices handle data ports and IP addresses during data transmission, and the evolved packet data gateway facilitates modification of the billing records.

Some embodiments of data protocol of FIG. 3 are illustrated in FIG. 20. Referring to FIG. 20 where a security tunnel 2009 is created between the node device 2001 and the evolved data packet gateway (ePDG) 2007. The communication between the node device 2001 and the sink device 2002 is based on a single hop or multiple hops in the non-cellular network, and the communication between the sink device 2002 and ePDG 2007 is based on the cellular network. To send a data packet, referring to the step 2011, the node device 2001 uses a security key to encrypt the data packet and indicates the inner source port and outer source port as W (i.e., the port in the node device 2001) and the inner source IP and outer source IP as ND (i.e., the IP address of the node device 2001). In the step 2012, the sink device 2002 transfers the data packet by indicating the inner source port as W, the inner source IP as ND, the outer source port as X (i.e., the port in the sink device 2002), and the outer source IP as SD (i.e., the IP address of the sink device 2002). When the ePDG 2007 receives the data packet, it will update its network connection tables; non-limiting examples of the tables include: most recent path tables, routing tables, address resolution protocol tables, bearer-tables, firewall tables, IP tables, and edge bridge tables. Because the data packet was originated by the node device 2001, the packet gateway 2006 should not charge the packet sent by the sink device 2002. In the step 2013, ePDG 2007 requests the packet gateway 2006 to delete the billing record of the sink device 2002. Meanwhile, the ePDG 2007 untunnels the data packet, decrypts the data packet, and forwards the data packet to the Internet directly (in which case the ePDG 2007 further request the packet gateway 2006 to add the corresponding billing record for the node device 2001), or via the packet gateway 2008 (e.g., packet gateway 2008 is the same as packet gateway 2006, or packet gateway 2008 is different from packet gateway 2006); in the step 2014, the ePDG 2007 indicates inner source port as W and inner source IP as ND.

Referring to FIG. 20 when a data packet sent from the Internet is received by the ePDG 2007, the data packet in the step 2015 indicates the inner destination port as W and the inner destination IP as ND. The ePDG 2007 tunnels the data packet, encrypts the data packet, and transmits the encrypted data packet to the node device 2001 via the sink device 2002. In the step 2016, the ePDG 2007 requests the packet gateway 2006 to delete the billing record of the sink device 2002, because the sink device is used to transfer data only. In the step 2017, the data packet includes the following information: inner destination port as W, inner destination IP as ND, outer destination port as X, and outer destination IP as SD. In the step 2018, the sink device 2002 transfers the data packet by indicating the inner destination port as W, inner destination IP as ND, outer destination port as W, outer destination IP as ND. When the node device 2001 receives the data packet, it uses the security key to decrypt the data packet.

In some embodiments illustrated in FIG. 20, the media, devices, networks, systems, and methods described herein include one or more relaying devices between the node device 2001 and the sink device 2002, the ePDG also request the packet gateway 2006 to delete billing records of the relaying devices.

In some embodiments illustrated in FIG. 20, the media, devices, networks, systems, and methods described herein include deep packet inspection. A non-limiting example is described as follows. The packet gateway (e.g., PGW) uses deep packet inspection (e.g., a whitelist rule) so that it does not create billing records for tunneled packets (e.g., IPsec tunneled packets) destined to (e.g., destination IP address of the tunneled packets matches that of the tunneling gateway) or sourced from (e.g., source IP address of the tunneled packets matches that of the tunneling gateway) the tunneling gateway (e.g., ePDG, PGW).

In some further embodiments, the steps 2013 and 2016 of deleting billing record of the sink device 2002 are not be required. In some embodiments illustrated in FIG. 20, the media, devices, networks, systems, and methods described herein include network address translation (NAT) (e.g., source-NAT, destination-NAT, IPv4-to-IPv6-NAT, and/or IPv6-to-IPv4-NAT) at one or more of the gateways (e.g., serving gateway, packet gateway, and/or ePDG). Then, the inner- and/or -outer source- and/or -destination ports of the data packet are modified at one or more of the gateways. Then, the inner- and/or -outer source- and/or -destination IP-addresses of the data packet are modified at one or more of the gateways.

Figure 21:
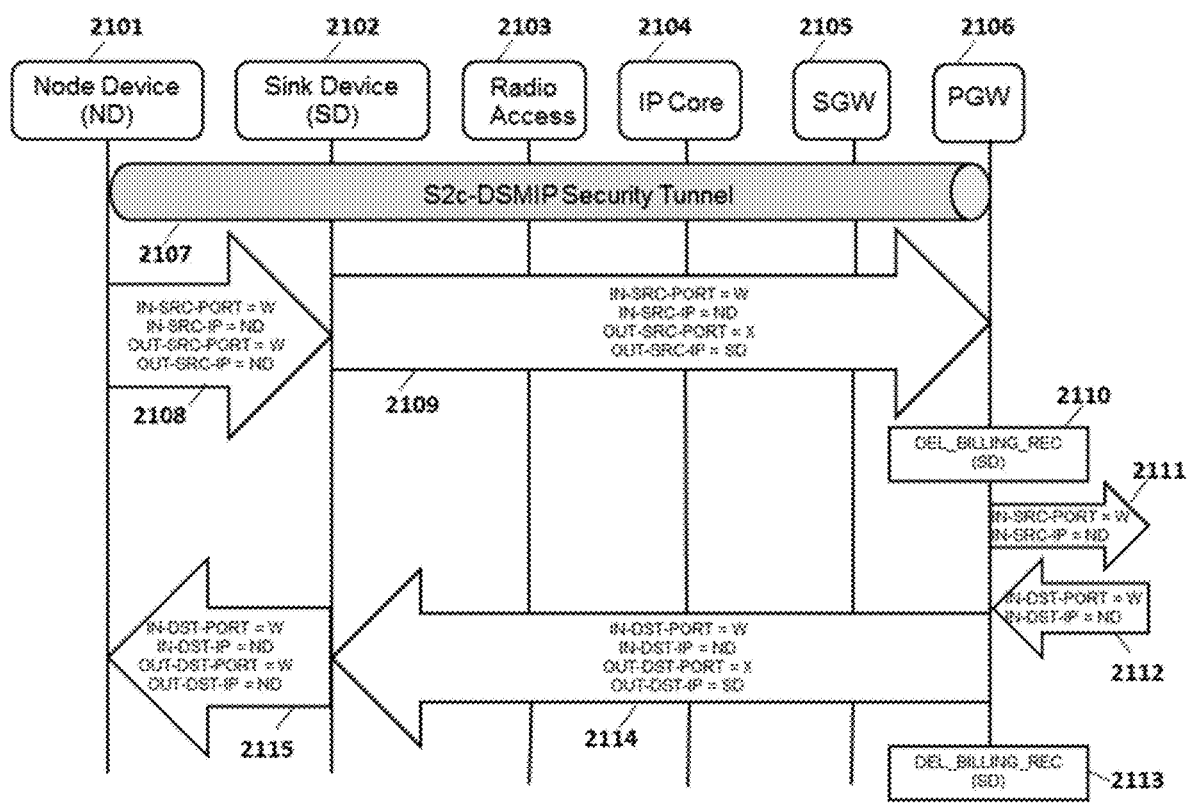
FIG. 21 shows a non-limiting example of a data protocol in a hybrid network; in this case, various devices handle data ports and IP addresses during data transmission, and the packet gateway handles the billing records.

Some embodiments of data protocol of FIG. 6 are illustrated in FIG. 21. Referring to FIG. 21 where a security tunnel 2107 is created between the node device 2101 and the packet gateway 2106. The communication between the node device 2101 and the sink device 2102 is based on a single hop or multiple hops in the non-cellular network, and the communication between the sink device 2102 and packet gateway 2106 is based on the cellular network. To send a data packet, referring to the step 2108, the node device 2101 uses a security key to encrypt the data packet and indicates the inner source port and outer source port as W (i.e., the port in the node device 2101) and the inner source IP and outer source IP as ND (i.e., the IP address of the node device 2101). In the step 2109, the sink device 2102 transfers the encrypted data packet by indicating the inner source port as W, the inner source IP as ND, the outer source port as X (i.e., the port in the sink device 2102), and the outer source IP as SD (i.e., the IP address of the sink device 2102). When the packet gateway 2106 receives the data packet, it will update its network connection tables; non-limiting examples of the tables include: most recent path tables, routing tables, address resolution protocol tables, bearer-tables, firewall tables, IP tables, and edge bridge tables. Because the data packet was originated by the node device 2101, the packet gateway 2106 should not charge the packet sent by the sink device 2102, so it deletes the billing record of the sink device in the step 2110. Meanwhile, the packet gateway 2106 untunnels the data packet, decrypts the data packet, and forwards the data packet to the Internet in the step 2111, where the packet gateway 2106 indicates inner source port as W and inner source IP as ND.

Referring to FIG. 21, a data packet in the step 2112 sent from the Internet is received by the packet gateway 2106. The data packet indicates the inner destination port as W and the inner destination IP as ND. In the step 2113, the packet gateway 2106 deletes the billing record of the sink device 2102, because the sink device is used to transfer data only. The packet gateway 2106 tunnels the data packet, encrypts the data packet, and transmits the encrypted data packet to the node device 2101 via the sink device 2102. In the step 2114, the data packet includes the following information: inner destination port as W, inner destination IP as ND, outer destination port as X, and outer destination IP as SD. In the step 2115, the sink device 2102 transfers the data packet by indicating the inner destination port as W, inner destination IP as ND, outer destination port as W, outer destination IP as ND. When the node device 2101 receives the data packet, it uses the security key to decrypt the data packet.

In some embodiments illustrated in FIG. 21, the media, devices, networks, systems, and methods described herein include one or more relaying devices between the node device 2101 and the sink device 2102, the packet gateway 2106 also delete the billing records of the relaying devices.

In some embodiments illustrated in FIG. 21, the media, devices, networks, systems, and methods described herein include deep packet inspection. Then, the steps 2110 and 2113 of deleting billing records of the sink device 2102 is be required. In some embodiments illustrated in FIG. 21, the media, devices, networks, systems, and methods described herein include network address translation (NAT) (e.g., source-NAT, destination-NAT, IPv4-to-IPv6-NAT, and/or IPv6-to-IPv4-NAT) at one or more of the gateways (e.g., serving gateway and/or packet gateway). Then, the inner- and/or -outer source- and/or -destination ports of the data packet are modified at one or more of the gateways. Then, the inner- and/or -outer source- and/or -destination IP-addresses of the data packet are modified at one or more of the gateways.

Those with skills in the art can recognize that the data protocols can be appropriately adjusted according to the network configurations.

Non-Transitory Computer Readable Storage Medium

In some embodiments, the media, devices, networks, systems, and methods described herein include one or more non-transitory computer readable storage media encoded with a program including instructions executable by the operating. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the media, devices, networks, systems, and methods described herein include at least one computer program, or use of the same. A computer program includes a sequence of instructions, executable in the digital processing device's CPU, written to perform a specified task. Computer readable instructions be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Mobile Application

In some embodiments, a computer program includes a mobile application provided to a wireless device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C #, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Software Modules

In some embodiments, the media, devices, networks, systems, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the media, devices, networks, systems, and methods disclosed herein include one or more databases, or use of the same. In view of the disclosure provided herein, those of skill in the art will recognize that many databases are suitable for storage and retrieval of network connections tables, billing records, battery life, bandwidth usages, types of devices, levels of mobility, time of day, subscription fees, user profiles, non-cellular signal strengths, cellular signal strengths, noise levels, and interference levels.

What is claimed is:

1. A method of secure data transfer in a communication system, the method comprising:
   connecting a sink device to a gateway of a cellular network via at least a first wireless link, wherein the gateway is external to a core network, wherein the sink device communicates with the core network via at least the gateway, and wherein a cellular base station is coupled between the sink device and the gateway;
   connecting a node device to the sink device via at least a second wireless link; and
   transmitting data from the gateway to the node device via at least the first wireless link and the second wireless link such that the data is encrypted over at least the second wireless link, wherein the node device is configured to decrypt the data.

2. The method of claim 1, further comprising generating, by the node device, decrypted data by at least decrypting the data.

3. The method of claim 1, wherein the node device is a user equipment.

4. The method of claim 1, further comprising receiving, by the gateway, second data from the node device via at least the second wireless link and the first wireless link, wherein the second data is encrypted over at least the second wireless link.

5. The method of claim 4, further comprising sending, by the gateway, the second data to a second gateway, wherein the second gateway is included in the core network.

6. The method of claim 1, wherein the sink device is non-portable.

7. The method of claim 1, wherein the second wireless link is non-cellular.

8. The method of claim 1, further comprising encrypting, by the gateway, the data for transmission to the node device.

9. A communication system with secure data transfer, the communication system comprising:
   a sink device; and
   a gateway configured to communicate with the sink device via at least a first wireless link, wherein the sink device is configured to communicate with a core network via at least the gateway, wherein the gateway comprises hardware that is external to the core network, and wherein a cellular base station is coupled between the sink device and the gateway;
   wherein the sink device is configured to communicate with a node device via at least a second wireless link; and
   wherein the communication system is configured to cause transmission of data from the gateway to the node device via at least the first wireless link and the second wireless link such that the data is encrypted over at least the second wireless link.

10. The communication system of claim 9, wherein the node device is a user equipment.

11. The communication system of claim 9, wherein the gateway is further configured to receive second data from the node device via at least the second wireless link and the first wireless link, wherein the second data is encrypted over at least the second wireless link.

12. The communication system of claim 11, wherein the gateway is configured to send the second data to a second gateway, and wherein the second gateway is included in the core network.

13. The communication system of claim 9, wherein the sink device is non-portable.

14. The communication system of claim 9, wherein the second wireless link is non-cellular.

15. The communication system of claim 9, wherein the gateway is further configured to encrypt the data for transmission to the node device.

16. A method of secure data transfer in a communication system, the method comprising:
   connecting a sink device to a first gateway of a cellular network via at least a first wireless link, wherein the first gateway is external to a core network, and wherein the sink device communicates with the core network via at least the first gateway;
   connecting a node device to the sink device via at least a second wireless link;
   receiving, by the first gateway, data from the node device via at least the first wireless link and the second wireless link, wherein the data from the node device is encrypted over at least the second wireless link; and
   sending, by the first gateway, the data to a second gateway, wherein the second gateway is included in the core network.

17. The method of claim 16, further comprising:
   sending, by the second gateway, second data to the first gateway; and
   transmitting the second data from the first gateway to the node device via at least the first wireless link and the second wireless link such that the second data is encrypted over at least the second wireless link.

18. The method of claim 16, wherein the node device is a user equipment.

19. The method of claim 16, wherein the second wireless link is non-cellular.

20. The method of claim 16, further comprising decrypting, by the first gateway, the data from the node device.

21. The method of claim 16, further comprising transmitting second data from the first gateway to the node device via at least the first wireless link and the second wireless link such that the second data is encrypted over at least the second wireless link, wherein the node device is configured to decrypt the second data.

22. A communication system with secure data transfer, the communication system comprising:
   a sink device; and
   a first gateway configured to communicate with the sink device via at least a first wireless link, wherein the sink device is configured to communicate with a core network via at least the first gateway, and wherein the first gateway comprises hardware that is external to the core network;
   wherein the sink device is configured to communicate with a node device via at least a second wireless link;
   wherein the communication system is configured to cause transmission of data from the node device to the first gateway via at least the first wireless link and the second wireless link such that the data is encrypted over at least the second wireless link; and
   wherein the first gateway is configured to send the data to a second gateway, the second gateway being included in the core network.

23. The communication system of claim 22, wherein the communication system is configured to cause:
   the second gateway to send second data to the first gateway; and
   the first gateway to transmit the second data to the node device via at least the first wireless link and the second wireless link such that the second data is encrypted over at least the second wireless link.

24. The communication system of claim 22, wherein the node device is a user equipment.

25. The communication system of claim 22, wherein the second wireless link is non-cellular.

26. The communication system of claim 22, wherein the first gateway is configured to decrypt the data from the node device.

27. The communication system of claim 22, wherein the communication system is configured to cause transmission of second data from the first gateway to the node device via at least the first wireless link and the second wireless link such that the second data is encrypted over at least the second wireless link, and wherein the node device is configured to decrypt the second data.

* * * * *